US011411965B2

(12) United States Patent
Williams et al.

(10) Patent No.: US 11,411,965 B2
(45) Date of Patent: Aug. 9, 2022

(54) METHOD AND SYSTEM OF ATTACK DETECTION AND PROTECTION IN COMPUTER SYSTEMS

(71) Applicants: Jeffrey Williams, Ashton, MD (US); Arshan Dabirsiaghi, Parkville, CA (US)

(72) Inventors: Jeffrey Williams, Ashton, MD (US); Arshan Dabirsiaghi, Parkville, CA (US)

( * ) Notice: Subject to any disclaimer, the term of this patent is extended or adjusted under 35 U.S.C. 154(b) by 0 days.

(21) Appl. No.: 15/294,728

(22) Filed: Oct. 15, 2016

(65) Prior Publication Data

US 2017/0142138 A1 May 18, 2017

Related U.S. Application Data

(63) Continuation-in-part of application No. 15/000,030, filed on Jan. 18, 2016, now abandoned, which is a continuation-in-part of application No. 14/177,628, filed on Feb. 11, 2014, now Pat. No. 9,268,945, which is a continuation-in-part of application No. 13/466,527, filed on May 8, 2012, now Pat. No. 8,844,043, which is a continuation of application No. 12/870,367, filed on Aug. 27, 2010, now Pat. No. 8,458,798.

(60) Provisional application No. 62/241,897, filed on Oct. 15, 2015, provisional application No. 62/408,775, filed on Oct. 15, 2016, provisional application No. 61/315,666, filed on Mar. 19, 2010.

(51) Int. Cl.

| | |
|---|---|
| ***G06F 17/00*** | (2019.01) |
| ***H04L 29/06*** | (2006.01) |
| ***H04L 29/08*** | (2006.01) |
| ***H04L 9/40*** | (2022.01) |
| ***G06F 21/55*** | (2013.01) |

(52) U.S. Cl.
CPC ........ *H04L 63/1416* (2013.01); *G06F 21/554* (2013.01)

(58) Field of Classification Search
CPC ............. H04L 63/1416; H04L 63/1433; H04L 63/1491; G06F 21/554
USPC .............................................................. 726/1
See application file for complete search history.

(56) References Cited

U.S. PATENT DOCUMENTS

2004/0107416 A1* 6/2004 Buban ..................... G06F 8/656 717/170
2005/0018618 A1* 1/2005 Mualem .............. H04L 63/1458 709/224
2005/0066023 A1* 3/2005 Sakurai ..................... G06F 8/71 709/223
2005/0188419 A1* 8/2005 Dadhia ................... G06F 21/52 726/1

(Continued)

*Primary Examiner* — Darshan I Dhruv

(57) ABSTRACT

In one example aspect, a computerized method of automatically detecting and blocking at least one attack on an application includes the step of modifying instructions of the application to include at least one sensor. The at least one sensor generates a set of events related to detecting an attack on the application or a computing system implementing the application. The method includes the step of reviewing, from within the application, the set of events generated by the at least one sensor. The method includes the step of detecting a presence of at least one attack on the application based on the review of the set of events. The method includes the step of invoking an attack response action.

14 Claims, 20 Drawing Sheets

(56) References Cited

U.S. PATENT DOCUMENTS

| | | | | | |
|---|---|---|---|---|---|
| 2005/0273861 | A1* | 12/2005 | Chess | G06F 21/577 | 726/25 |
| 2008/0083030 | A1* | 4/2008 | Durham | G06F 8/656 | 726/22 |
| 2008/0098476 | A1* | 4/2008 | Syversen | H04L 63/0227 | 726/23 |
| 2009/0024986 | A1* | 1/2009 | Meijer | G06F 8/437 | 717/137 |
| 2009/0199297 | A1* | 8/2009 | Jarrett | G06F 21/566 | 726/24 |
| 2011/0113388 | A1* | 5/2011 | Eisen | G06F 21/554 | 715/856 |

* cited by examiner

| | | Data | Resource |
|---|---|---|---|
| 701 | DATA | "foo!" | **doPost()**-FooServlet.java@134 HttpServletRequest.getParameter("...") |
| 702 | TEST | "foo!".equals("bar!")::FALSE | **doPost()**-FooServlet.java@138 "foo!".equals("bar!") |
| 703 | PROP | foo!bar!test! | **doAction()**-BusinessAction.java@2... StringBuilder.append("bar!test!") |
| 704 | PROP | foo!test! | **doAction()**-BusinessAction.java@2... String.removed(4,7); |
| 705 | DATA | foo!test!bad | setData-DataBean.java@25 StringBuilder.append("bad"); |
| 706 | TEST | "foo!test!bad".matches("[a-z]*")::FALSE | checkAlpha() – StringUtils.java@136- Pattern.matcher("[a-z]*") |
| 707 | TEST | foo%21bar%21bad | service() – report/jsp.java@324 URLEncoder.encode() |
| 708 | USE | <form...value=foo%21test%bad/>...orm> | service() – report/jsp.java@324 PrintWriter.write("<form><input Value=foo%21bar%21bad/></form>") |

Full context
-Object
-Params
-Return

Full stack trace

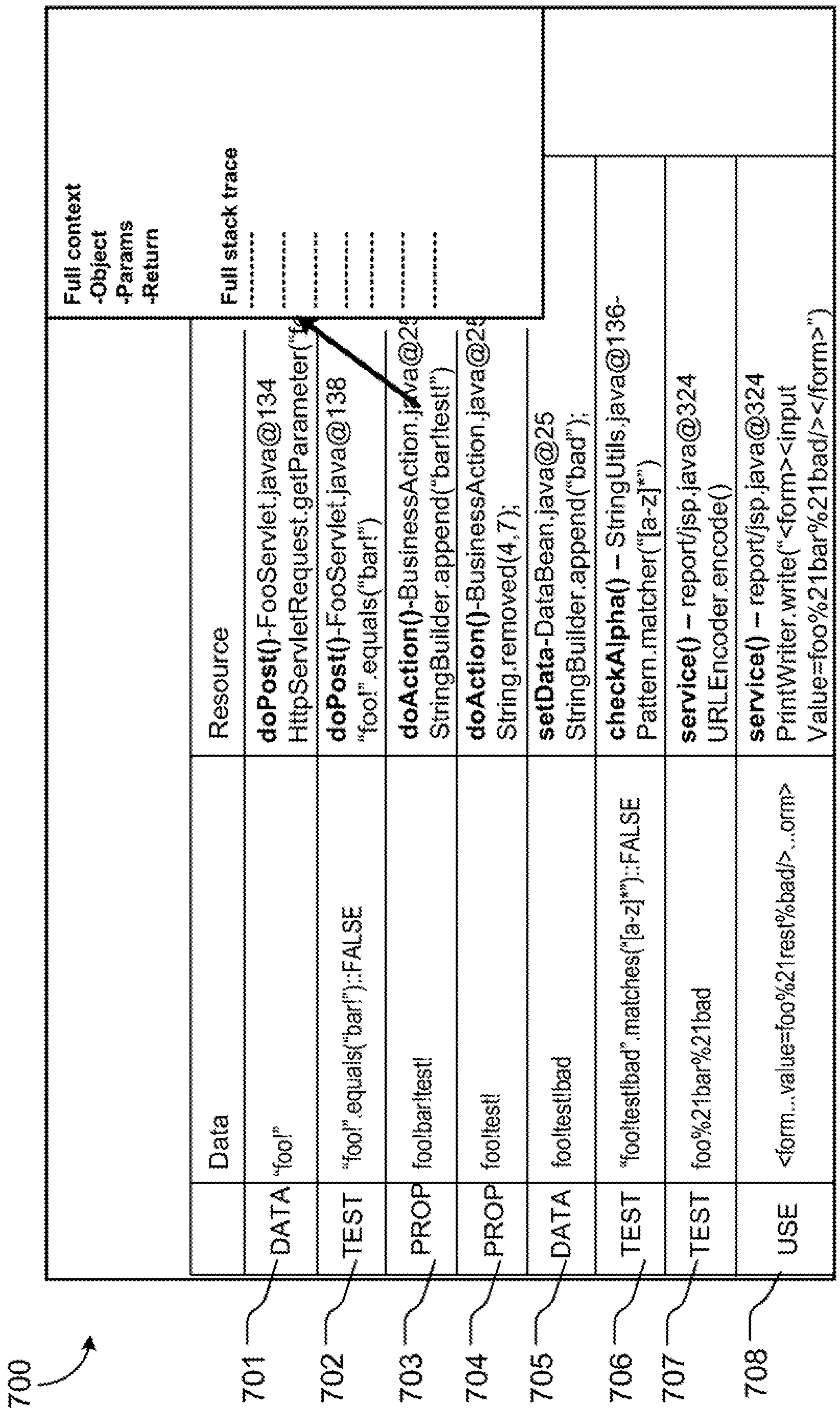

```
<?xml version="1.0" encoding="UTF-8"?>
<trace>
  <!--Trace generated by Aspect Security WhiteCell - http://www.aspectsecurity.com-->
  <timestamp value="Sun Dec 13 00:58:25 EST 2008"/>
  <event type="DATA">
    <context>
      <class type="org.apache.catalina.connector.RequestFacade" value="org.apache.catalina.connector.RequestFacade@ee6ad6"/>
      <method name="getParameterValues" return="[Ljava.lang.String;@a826da"/>
      <parameters types="java.lang.String" values="&quot;HelpFile&quot;"/>
    </context>
    <stack>
      <call level="1" value="org.apache.catalina.connector.RequestFacade.getParameterValues(RequestFacade.java:388)"/>
      ...
    </stack>
  </event>
  <event type="TEST">
    <context>
      <class type="java.util.regex.Pattern" value="\.help"/>
      <method name="matcher" return="java.util.regex.Matcher[pattern=\.help region=0,12 lastmatch=]"/>
      <parameters types="java.lang.CharSequence" values="&quot;foo;bar&cat1{0, 1, 2, 3, 4, 5, 6, 7, 8, 8, 10,11}12*&quot;"/>
    </context>
    <stack>...</stack>
  </event>
  <event type="USE-FileInjection">
    <context>
      <class type="java.io.File" value="C:\Users\jwilliams\Desktop\apache-tomc...apps\WebGoat\lesson_plans\foo;bar&cat1
                {0, 1, 2, 3, 4, 5, 6, 7, 8, 8, 10, 11}0*"/>
      <method name="" return="null"/>
      <parameters types="java.io.File,java.lang.String" values="C:\Users\jwilliams\Desktop\apache-tomcat-6.0.18\
                webapps\WebGoat\lesson_plans,&quot;foo;bar&cat1{0, 1, 2, 3, 4, 5, 6, 7, 8, 8, 10, 11}12*&quot;"/>
    </context>
    <stack>...</stack>
  </event>
</trace>
```

FIG. 8

Edit rule

General
- Rule ID: ☐ Enabled
- Name:
- Category: Authentication ▼
- Vulnerability severity: Critical ▼
- Risk:
- Recommendation:
- References:

Pattern
- Logic: ○ Positive  Type: ○ Triggered  Connector: ● Choice
- ○ Negative  ○ Scoped  ○ All
- ☐ Events limited to an instance  ○ Sequence
- [Find class]

Events
- [+] [✗] [✗]

- Method: [Find method]
- ☐ Include overrides and implementations ☐ Calling object must be tracked
- Parameters required to be tracked:
  - ☐ Parameters 1 (java.lang.String)
  - ☐ Parameters 2 (java.io.BufferedReader)

[Save] [Cancel]

1100

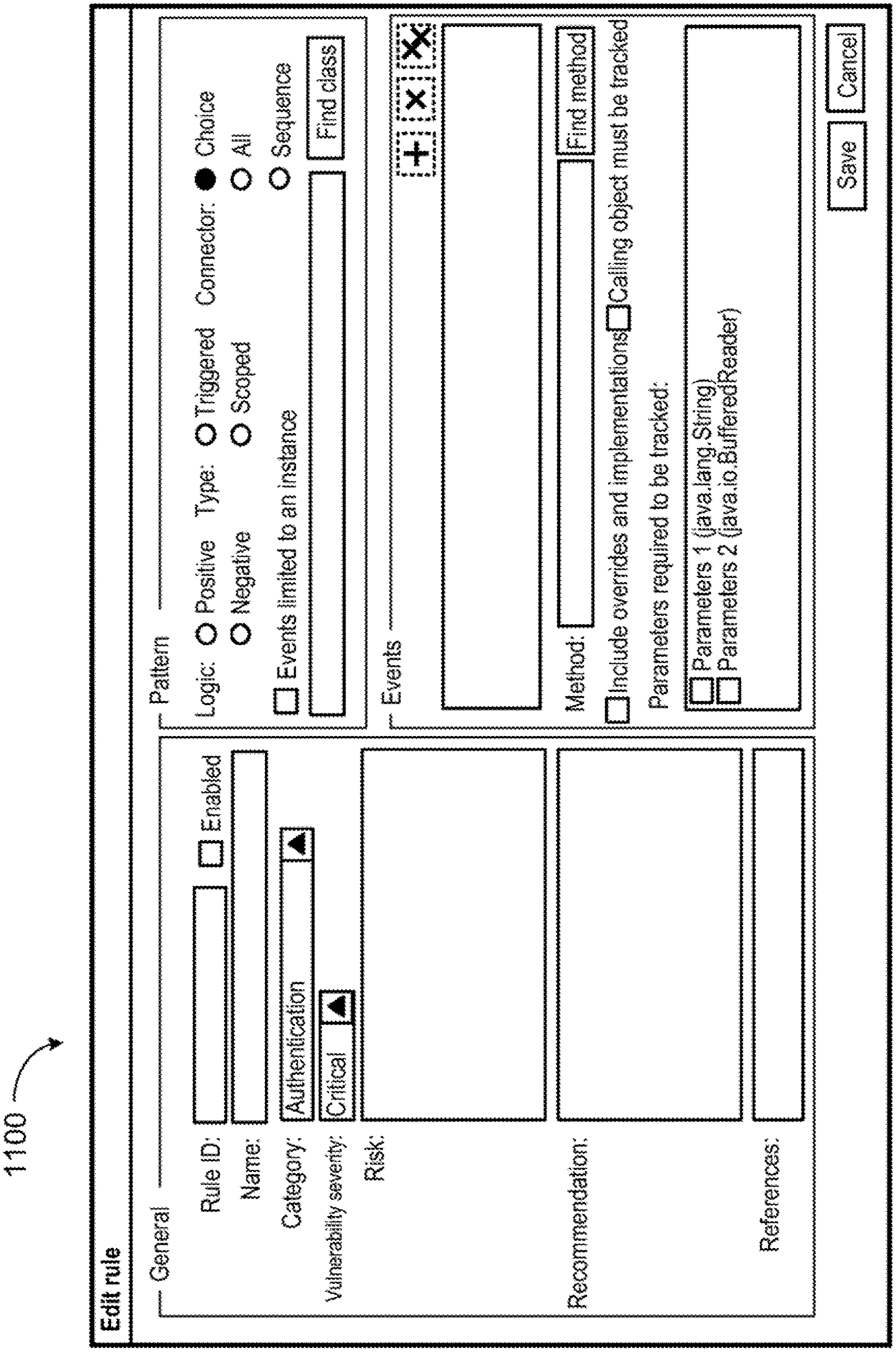

FIG. 11

WhiteCell Vulnerability: Cross-site Scripting (FIHQ-L1SE-POIU-TMNZ-XQFA)

| Vulnerability Summary | Events Details | Remediation | HTTP Info | References |

Current State: Confirmed

The application has a cross-site scripting vulnerability which terminates at JspWriterImpl.line 21. The data is originally pulled from a "request.getParameter()" call on FooServlet.java:line 134. What's shown is a summary of the user-controlled data that is eventually fed into the application's dangerous sink.

1401

| CREATION | foo | doPost() at FooServlet.java@134 |
| PROPAGATION | "foo" | doPost() at FooServlet.java@136 |
| PROPAGATION | he said "foo" | doAction() at ShowFundsAction.java@912 |
| TRIGGER | he said "foo" to her | print() at JspWriterImpl.java@21 |

1400

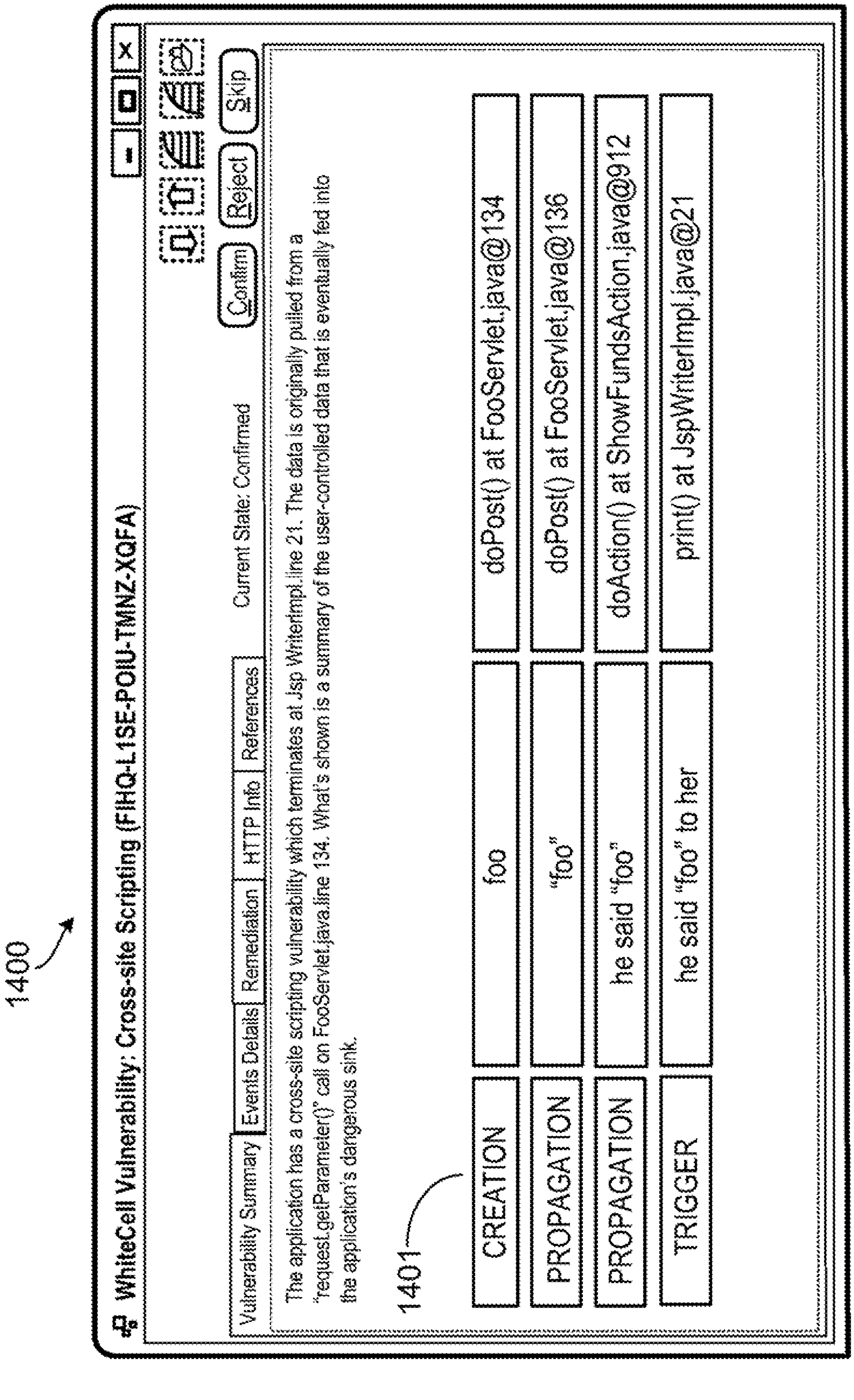

FIG. 14

METHOD AND SYSTEM OF ATTACK DETECTION AND PROTECTION IN COMPUTER SYSTEMS

CROSS-REFERENCE TO RELATED APPLICATIONS

This application claims priority to U.S. Provisional Application No. 62/408,775, filed on Oct. 15, 2016. This application also claims priority to U.S. Provisional Application No. 62/241,897, filed on Oct. 15, 2015. This application is also a continuation-in-part (and claims the benefit of priority under 35 U.S.C. 119) of U.S. application Ser. No. 15/000,030, filed on Jan. 18, 2016, which claims benefit to as a continuation-in-part of U.S. application Ser. No. 14/177,628, filed on Feb. 11, 2014 now U.S. Pat. No. 9,268,945, issued Feb. 23, 2016, which claims benefit to U.S. application Ser. No. 13/466,527, filed May 8, 2012, now U.S. Pat. No. 8,844,043, issued Sep. 23, 2014, which claims benefit to U.S. application Ser. No. 12/870,367, filed Aug. 27, 2010, now U.S. Pat. No. 8,458,798, issued Jun. 4, 2013, which claims the benefit to U.S. Provisional Application Ser. No. 61/315,666, filed on Mar. 19, 2010. All of these prior applications are incorporated by reference in their entirety. These provisional and utility applications are hereby incorporated by reference in their entirety.

BACKGROUND

1. Field

This description relates to the field of attack detection and protection in computer systems.

2. Related Art

For years, organizations have struggled to block attacks on vulnerable software applications. Application software controls finances, healthcare information, legal records, and even military defenses. Further, application software is growing and interconnecting at an unprecedented rate. This increasing reliance on software combined with common vulnerabilities and rapidly increasing complexity creates significant business risk stemming from the use of software applications. Accurately detecting and defending against attacks on these applications can minimize the likelihood of a breach even when the underlying software contains vulnerabilities. Therefore, there exists a need for a better method of performing attack detection and protection in software applications and services.

BRIEF SUMMARY OF THE INVENTION in one example aspect, a computerized method of automatically detecting and blocking at least one attack on an application includes the step of modifying instructions of the application to include at least one sensor. The at least one sensor generates a set of events related to detecting an attack on the application or a computing system implementing the application. The method includes the step of reviewing, from within the application, the set of events generated by the at least one sensor. The method includes the step of detecting a presence of at least one attack on the application based on the review of the set of events. The method includes the step of invoking an attack response action.

Optionally, the set of events can be related to detecting both the attack on the application or the computing system implementing the application and a vulnerability detection related to an attack vulnerability of the application or in the computing system implementing the application. The detected attack can include a bot attack. The detected attack can include an attempt to exploit a Common Vulnerabilities and Exposures (CVE) in a library of the application or in the computing system implementing the application. The method can include the step of enabling a custom set of rules and responses to be enforced as a virtual patch. The attack response action can include a logging action that records a set of events related to the attack. The attack response action can include throwing an exception. The attack response action can include redirecting the user's web browser to another web page. The attack response action can include sending the user's web browser to a honeypot mechanism. The attack response action can be adding or enabling a specified security feature or reconfiguring the application. The sensors and the attack response actions can be controlled by a set of rules.

BRIEF DESCRIPTION OF THE DRAWINGS

The present application can be best understood by reference to the following description taken in conjunction with the accompanying figures, in which like parts may be referred to by like numerals.

FIG. 7 is an illustration of how the tracking module tracks propagating data through the executing application.

FIG. 8 is a screen-shot of a trace generated by the attack detection and protection system, according to some embodiments.

FIGS. 10 and 11 are screen-shots illustrating a graphical user interface (GUI) used for configuring policies and rules for the attack detection and protection system.

FIGS. 12-18 are screen-shots illustrating various aspects of a graphical user interface used for reviewing results produced by the attack detection and protection system.

Figure 1:
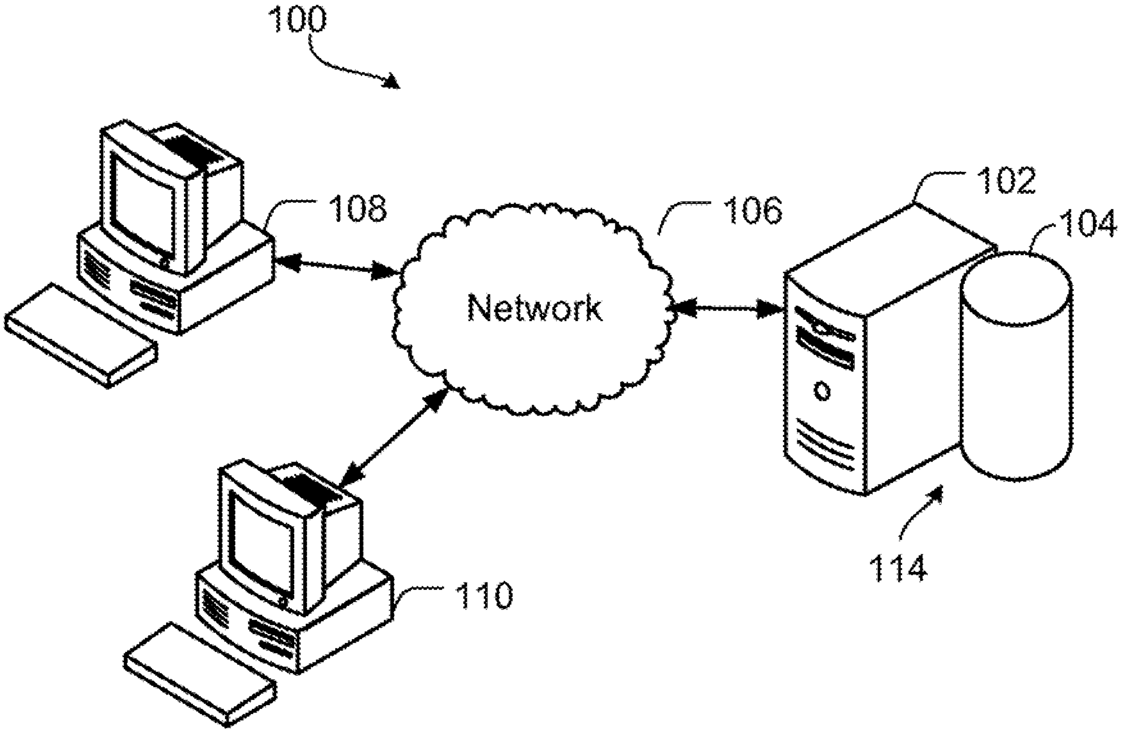
FIG. 1 is a diagram of network architecture of the attack detection and protection system, according to some embodiments.

The Figures described above are a representative set, and are not an exhaustive with respect to embodying the invention.

DETAILED DESCRIPTION

Disclosed are a system, method, and article of manufacture for attack detection and protection in computer systems. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Attack can be any attempt to destroy, expose, alter, disable, steal, corrupt, interfere with and/or gain unauthorized access to or make unauthorized use of an asset (e.g. a computer application, etc.).

Bot can be a type of malware that allows an attack to take control over an affected computer.

Common Vulnerabilities and Exposures (CVE) can be a public repository for known vulnerabilities.

Configuration information can include property files, xml documents, and initialization files, and the like.

Honeypot mechanism can be a computer security mechanism set to detect, deflect, or, in some manner, counteract attempts at unauthorized use of information systems.

Library can be a collection of subprograms. A library can be a module, framework, component, or any other body of code that executes as part of an application.

Sensor can be a passive monitor, an active monitor, or an actuator that causes actions to be taken.

Throwing an exception can include creating an exception object and handing it to a runtime system. An exception is any form of error condition within a program that causes the application's exception handling logic to be invoked.

Virtual patch can be a short-term implementation of a security policy meant to prevent an exploit from occurring as a result of a newly discovered vulnerability. A virtual patch can be any software added to an application with the purpose of blocking a class of attacks from causing harmful effects or preventing a class of vulnerabilities from being exploited Process Overview Implementations of the present disclosure are generally directed to a method for detecting and protecting against the presence of at least one attack on a software application. More specifically, implementations of the present disclosure relate to how the instructions of the application are modified to include at least one sensor, the presence of at least one attack is detected based on the analysis of events generated by the sensors, and one or more response actions are invoked.

Referring now to FIG. 1, a schematic illustration of an example system 100 in accordance with implementations of the present disclosure can include a plurality of clients 108, 110, and a computer system 114. The computer system 114 can include a server 102 and a database 104. In some implementations, the system 100 can represent a client/server system supporting multiple computer systems (e.g., computer system 114) including one or more clients (e.g., clients 108, 110) and/or one or more servers (e.g., server 102) that are connectively coupled for communication with one another over a network 106. In some implementations, the clients (e.g., clients 108, 110) can be directly connected to the one or more servers (e.g., server 102) (without connecting by way of network 106).

The clients 108, 110 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 108, 110 can access application software on the server 102.

In some implementations, the client devices 108, 110 can communicate wirelessly through a communication interface (not shown), which can include digital signal processing circuitry where necessary. The communication interface can provide for communications under various modes or protocols, such as GSM voice calls, SMS, EMS, or MMS messaging, CDMA, TOMA, PDC, WCDMA, COMA2000, or GPRS, among others. For example, the communication can occur through a radio-frequency transceiver (not shown). In addition, short-range communication can occur, such as using a Bluetooth, WiFi, or other such transceiver.

In some implementations, the system 100 can be a distributed client/server system that spans one or more networks such as network 106. The system 100 can be a cloud computing system. The network 106 can be a large computer network, such as a local area network (LAN), wide area network (WAN), the Internet, a cellular network, or a combination thereof connecting any number of mobile clients, fixed clients, and servers. In some implementations, each client (e.g., clients 108, 110) can communicate with the server 102 via a virtual private network (VPN), Secure Shell (SSH) tunnel, or other secure network connection. In some implementations, the network 106 can include the Internet, a wireless service network and can include the Public Switched Telephone Network (PSTN). In other implementations, the network 106 can include a corporate network (e.g., an intranet) and one or more wireless access points.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) can communicate with the server 102 by way of network 106. In some implementations, a user can invoke applications available on the server 102 in a web browser running on a client (e.g., clients 108, 110). Each application can individually access data from one or more repository resources (e.g., database 104). For example, the server 102 can access database 104.

Applications can be provided either by the hosted computing system or from third party systems that are separate from the hosted computer system. Such applications can include services that provide information about locations of various users (as determined, e.g., from GPS on their mobile devices), services that provide news and weather feeds, and other such services. The applications can also include, for example, email and other messaging applications, productivity applications such as spreadsheets and word processors, mapping applications, and mash-ups of various applications that can be presented together in a single presentation.

The application software can be hosted by server 102 in some example embodiments. In other example embodiments, the application software can be hosted on various computing systems, such as, inter alia, mobile devices, laptops, desktops, drones, refrigerators, various internet of things devices, etc. These systems can include various vulnerabilities. For example, the software can include vulnerable data and control flow patterns that enable attackers to force the software to perform various unintended actions. The attacks can be directed from clients 108 or 110 or any other computers. One common vulnerability that attackers attempt to identify is the flow of untrusted data from its entry point, known as a "source," to a vulnerable Application Programming Interface (API), known as a "sink." An example of this problem is called SQL injection, which occurs when untrusted data makes its way through an application and eventually becomes a part of an SQL query. An attacker can manipulate the input data to change the meaning of the SQL query and cause significant harm to the repository resources (e.g., database 104). Other known vulnerabilities, such as command injection, cross-site scripting, weak cryptography, cross-site request forgery, insecure transport, insecure redirect, parameter tampering, session hijacking, security misconfiguration, weak authentication, broken access control, and weak input validation, are also often exploited by attackers.

Figure 2:
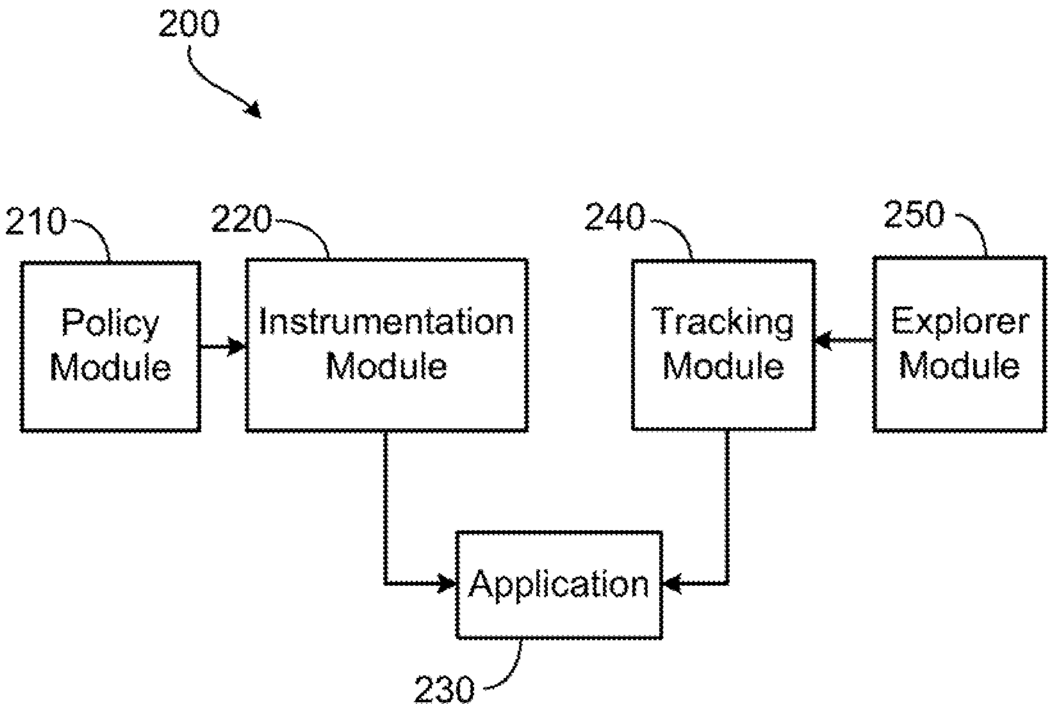
FIG. 2 is a block diagram of the attack detection and protection system, according to some embodiments.

FIG. 2 is a block diagram of an attack detection and protection system 200 in accordance with implementations of the present disclosure that can detect attacks and invoke appropriate response actions in the software. The attack detection and protection system 200 can be implemented as a client/server system, an example of which can include system 100 of FIG. 1. The attack detection and protection 200 can be implemented using client 108, network 106, and computer system 114 that includes server 102 and database 104.

The attack detection and protection 200 includes a policy management module 210, an instrumentation module 220 that is used to instrument a software application 230, a tracking module 240 that collects and analyzes data from the instrumented application 230, and an explorer module 250 that enables an administrative user to browse the results of the attack detection and protection and/or vulnerability analysis. The attack detection and protection system 200 or its components can be written in or based on any appropriate computer language including Java, C, C++, Visual Basic, Perl, and others. It will be understood that the attack detection and protection system 200 can reside on a single or multiple computers and can also include an interface for communicating with other computer systems. What follows is a general overview of the attack detection and protection system 200.

In general, the vulnerability detection system 200 operates based on a set of security rules specified with the policy management module 210. These security rules control the process of attack detection and protection in the application 230 by the attack detection and protection system 200. The security rules have a two-fold purpose. First, the security rules list specific conditions (e.g., events) that, when satisfied, indicate the presence of particular attacks on the application. Specifically, security rules specify one or more events that when evaluated together correspond to a pattern that indicates a potential attack. Second, the rules identify methods in the application 230 that are relevant to detecting and protecting against attacks. In particular, each event in the rule identifies one or more methods that need be instrumented by the instrumentation module 220. Multiple rules can be further grouped into policies. In essence, a security policy is a collection of one or more security rules that are designed to detect and protect against one or more related attacks. Security polices can be designed to ensure that security is enforced for particular components. For example, a user may create a policy that protects against attacks such as cross-site scripting, SQL injection, cross-site request forgery, padding oracle attacks, brute force attacks, and attempts to bypass authorization.

The attack detection and protection system 200 inserts passive and active software sensors into each of the methods designated by the events in the security rules—a process referred to as "instrumentation." During execution of the application 230, each inserted passive sensor generates an event that is collected and analyzed by the tracking module 240 whenever the instrumented method is invoked. This collected data, referred to as an "event" is essentially a snapshot of data associated with the method as it is being executed. For example, the event can include various information associated with the invoked method, such as the parameters of the method, the copy of the object that invoked the method, the return value of the method, or the trace of the stack at the time the method was called. Active sensors allow the attack detection and protection system to take one or more actions in response to a detected attack.

The tracking module 240 collects the generated events from the application 230 and analyses the data for the presence of attacks. The analysis may be performed during the execution of the application or after the application has completed its execution. In general, the tracking module 240 collects all of the generated events.

When the tracking module 240 determines that a particular rule is violated (e.g., the rule pattern is matched), the attack detection and prevention system directs the application to take one or more attack response actions. Response actions are carried out by active sensors that have been instrumented into the code, in combination with code from the attack detection and prevention system. Response actions typically includes generating an attack report and notifying the appropriate users in a variety of ways, including local log files, alerts and notifications, and via a management console. When the attack detection and protection system 200 generates an attack report for a particular rule, it means that some method in the application 230 satisfied the potentially problematic pattern or the condition of that rule. Attack reports include information about the rule, the violated condition, as well events that are associated with the rule. These events can include an HTTP request and response, details of code execution, stack traces, application state, configuration information, SQL and other backend queries and communication, configuration information, and libraries in use. In some implementations, the attacker can be notified that the attack has been detected with a warning message or error screen. The attacker can also be redirected to another system, possibly for further attack analysis.

In addition, response actions can also cause the application to take protective or other measures. Response actions can include generating an exception condition within the application that prevents the attack from completing. In addition, response actions can include enabling or invoking additional security defenses, such as an authentication challenge or change in application configuration. Response actions can cause relevant user accounts to be logged out, locked, flagged for password reset, or notified of the attack. More stringent authentication can be required. Additional logging can be enabled. In addition, some or all of the application can be disabled, either entirely or according to some thresholds or quotas. These response actions can be enabled temporarily or permanently.

When used with multiple applications, the attack detection and protection system can provide security insight across the entire portfolio of applications or services. Partial attack information can be assembled by the attack detection and protection system to identify attacks on applications or services that span multiple systems. Such systems may include physical servers distributed over a communication network (including middleware or proxies). Such systems may also include server processes/threads on one physical machine. Further, the attack detection and protection system can generate an accurate application inventory that includes details of languages, modules, frameworks, lines of code, and other details of the application being monitored. All of the security intelligence generated by the attack detection and protection system may be created in real time and monitored continuously.

As explained above, the attack detection and protection system 200 generally operates in two stages. First, the attack detection and protection system 200 instruments the code of the application 230 with sensors, either during or prior to its execution. Second, the vulnerability detection system 200 collects and analyses data from the sensors of the executing application 230 to detect attacks and take action. A detailed discussion of each stage of the operation of the attack detection and protection system 200 follows.

Figure 3:
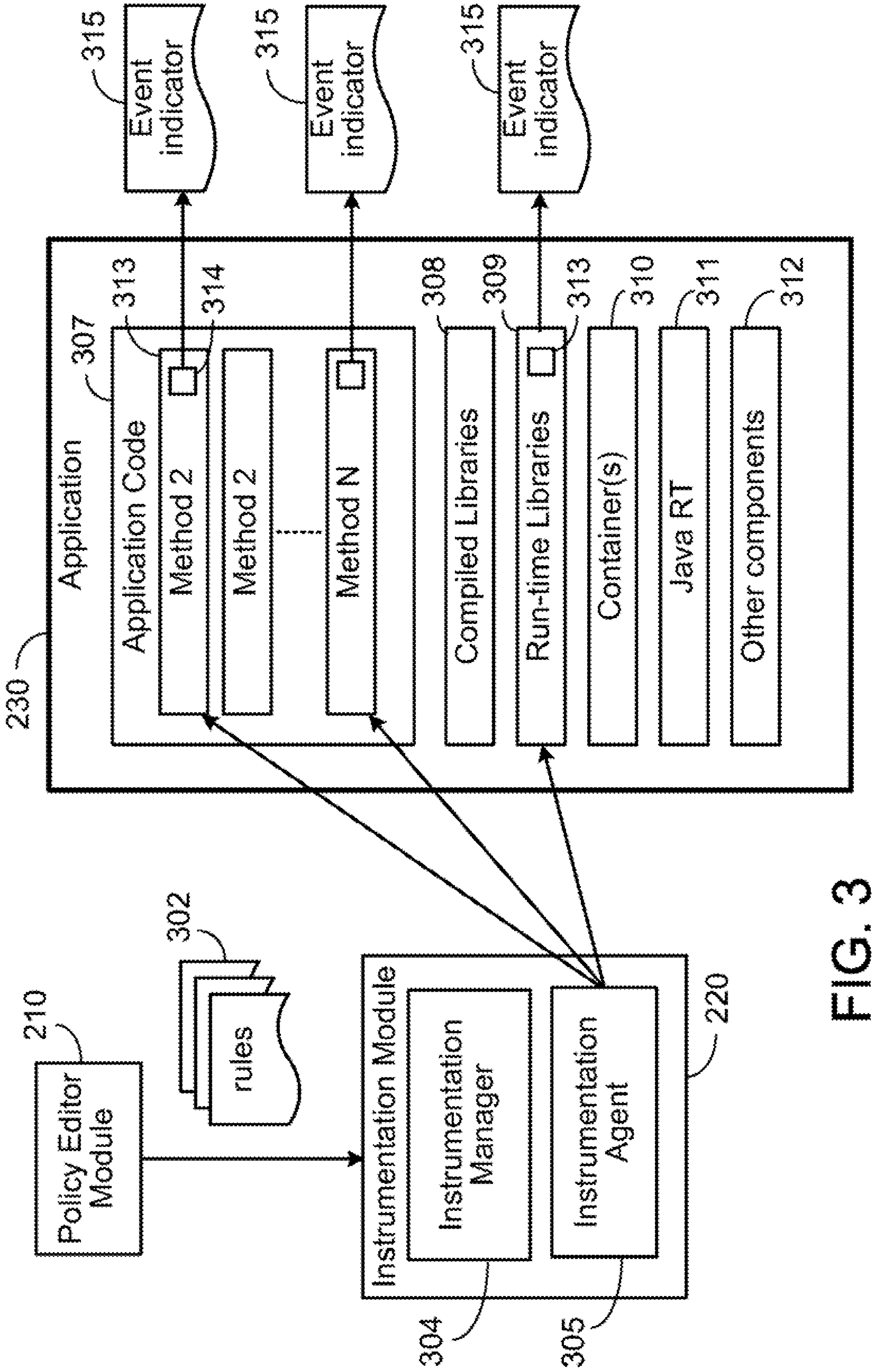
FIG. 3 is block diagram of the attack detection and protection system, according to some embodiments.

FIG. 3 is a block diagram that Illustrates a more detailed view of the attack detection and protection system 200 as it instruments the software application 230. In particular, FIG. 3 is directed to the instrumentation of the application 230 with the help of the policy management module 210 and the instrumentation module 220.

Software application 230 can include a number of software components. In some implementations, the application 230 includes application code 307, compiled libraries 308, run-time libraries 309, container classes 310, virtual machine 311, and other software components 312. These components can also include methods or subroutines 313, such as shown in more detail for application code 307. A method or a subroutine usually includes a sequence of programming statements to perform an action, a set of input parameters to customize those actions, and possibly a return value. In object-oriented technologies, a method is typically associated either with a class (e.g., a class method or a static method) or with an object (e.g., an instance method). Methods provide a mechanism for accessing and manipulating the encapsulated data stored in an object.

As previously explained, programming flaws in methods or subroutines within the application 230 can render the application 230 vulnerable to attacks and security breaches. To detect and protect against attacks on the application 230, the attack detection and protection system 200 inserts sensors into the methods of the application 230. The inserted sensors monitor data associated with methods of the application 230 during its execution and can take protective action in the case of a detected attack. A sensor is a piece of executable code that extracts data from within an executing application. A sensor can also be used to alter the execution of the application. A sensor is wrapped in exception handling logic that ensures that the application's execution is not unintentionally modified.

The process of inserting sensors in the application 230 is referred to as "instrumentation." Attack detection and protection system 200 uses the policy management module 210 to govern the process of instrumenting the application 230. In particular, with the policy management module 210, an administrative user can create or edit one or more security rules 302 that specify methods within the application 230 that require instrumentation with one or more sensors. In addition, security rules 302 can also specify a pattern that signals a presence of a security attack, as well as other information such as the appropriate response actions.

The attack detection and protection system 200 relies on the instrumentation module 220 to insert sensors 314 in the application 230 according to a set of security rules 302 specified with the policy management module 210. In particular, the instrumentation module 220 includes an instrumentation manager 304 and an instrumentation agent 305. The instrumentation agent 305 processes security rules 302, which specify the methods requiring instrumentation and direct the instrumentation agent 305 to install sensors into the specified methods of the application 230.

Not all methods need to be instrumented. For example, some methods are not relevant to security and so there is little point of instrumenting them, because instrumentation carries additional performance overhead. In contrast, other methods are relevant to many different security attacks and therefore need to be instrumented to detect attempted attacks. Security rules 302 identify such methods and also specify conditions or patterns that, when triggered, indicate presence of vulnerabilities in those methods.

It is noted that some potential attacks may be determined to be innocuous in the current context of application 230. These attacks can be designated as "ineffective attacks". Accordingly, the system may not implement an active attack response action (e.g. will not throw an exception, etc.). Rather, the system can be run in a log mode and log the ineffective attack and concomitant metadata.

The instrumentation agent 305 instruments the application 230 by inserting sensors 314 into the methods specified by event objects in security rules 302. In some implementations, the instrumentation agent 305 changes the code of the application 230, but does not change any fields in the instrumented classes or methods. Therefore, no data, such as flags, bits, indicators, links, or any other state is added in the instrumented methods or classes. As a result, execution of the application 230 is not adversely affected. In other implementations, the instrumentation agent 305 changes the state associated with methods or classes of the application 230 to facilitate data tracking.

To facilitate rule creation and maintenance, rules may be written to enable instrumentation of multiple methods in one application. By way of example, instrumentation may include parsing the binary codes of an application software as the binary codes are being loaded from a storage device to inject a monitor code. The parsed software code may then be executed by one or more hardware processors. The injection sites may be specific to the particular application software. Instrumentation may follow the rules disclosed herein. For example, some rules may indicate an interface, wildcard, or other way of specifying a collection of methods. In one implementation, a single rule may be written once and then applied to classes at all levels of an inheritance hierarchy. The instrumentation agent 305 may apply the written rules to all the appropriate method implementations across the codebase. In addition, methods to be instrumented may be actually implemented in classes or components other than the classes or components explicitly mentioned within the rule. Hence, the rules may be applied to classes or components not explicit in the rule.

The instrumentation agent 305 can instrument methods dynamically, statically, or by using a hybrid mode of instrumentation. Dynamic instrumentation involves inserting sensors in methods of the application 230 during execution of the application 230 through the use of an API designed for that purpose, such as the Java Instrumentation API. Another type of instrumentation is static instrumentation, in which the code of the application 230 is instrumented with sensors 314 before the application 230 begins to execute. In this case, the instrumentation agent 305 changes the source, object, or executable code of the application 230 to include the instructions or sensors 314 necessary for monitoring. In some implementations, hybrid instrumentation of the application 230 is also possible, such that some methods of the application 230 are instrumented statically, while other methods are instrumented dynamically when the application 230 is executing.

In operation, inserted sensors 314 can generate snapshots of data passed into, through, or out of the methods during execution of the application 230, as well as other data associated with the executing application 230. Each of these snapshots is referred to as an "event." Events 315 can be correlated and analyzed by the attack detection and protection system 200 to identify possible attacks. Once instrumented, sensors 314 in the application 230 generate events 315 that are passed to the tracking module 240 during execution of the application 230.

The instrumentation module 220 can insert a number of different sensors into the application 230. These sensors generate events whenever an instrumented method is invoked. The tracking module 240 collects all the generated events during the operation of the application 230. Various types of sensors can be utilized, including, inter alia, passive sensors, active sensors, and response sensors. These types of sensors are discussed in further detailed herein. Attack analysis occurs throughout the execution of the application based on the data gathered from all the sensors.

Passive sensors generate events that are stored by the tracking module 240 for later analysis. These sensors are used to collect various types of data from the executing application 230 that is later used during attack detection and protection and/or vulnerability analysis. For example, an "passive" sensor simply tells the tracking module 240 to store its events for later use. Events may include any information associated with the instrumented method, such as the parameters of the method, the return value of the method, or the trace of the stack at the time the method was called. Another type of a passive sensor is an "object" sensor. The "object" sensor generates events that include data associated with particular objects, such as objects of methods that receive untrusted data.

Yet another type of passive sensor is a "propagation" sensor, which is installed into methods that copy data from one object to another. The propagation sensor generates events whenever a particular piece of data is copied between objects and enables the tracking module 240 to follow the changes to that data as it is being propagated through various components of the application 230. Another type of an active sensor is a "scope" sensor that generates an event when the end of a scope of a particular method is reached—that is, when the application exits that method.

An "active" sensor takes action to gather data from the application. These sensors can interrogate the application environment, configuration, framework, or codebase to gather data. One important type of active sensor monitors for HTTP requests and responses and application server configuration. HTTP request and response sensors capture the HTTP traffic either received at or transmitted from the application server. HTTP response and request sensors may then use the captured HTTP traffic as part of attack analysis. For example, examining the HTTP response may allow some implementations to quickly and accurately identify security attacks such as parameter tampering, session hijacking, and missing cross-site request forgery tokens. Application server configuration sensors, on the other hand, may access properties files, XML files, APIs, and other sources of configuration data and use that data as part of the attack analysis, such as the misconfiguration of defenses, improperly protected files, unencrypted passwords, and many others. Other types of sensors are also possible and would be apparent to one of the ordinary skill in the art. The events from all of these sensors may be combined with data from other sensors when identifying attacks.

A "response" sensor takes action to respond to a detected attack. The range of possible response sensors is very broad, and could include all of the response actions detailed above. These response sensors are instrumented into the target application and are invoked when attacks on the application are detected. Multiple response sensors may be used to handle all the different necessary responses to an attack.

Performance of the sensor installation and operation may be critical to the real-time operation of the attack detection and protection. One technique that can be used to enhance the performance of the instrumentation process is to cache the required code changes as the sensors are installed in the codebase. As long as the policy does not change, the cached changes can be applied rather than reapplying the rules to the entire application each time the application starts. In other words, the process of instrumenting the code when the application starts may be sped up by caching.

Figure 4:
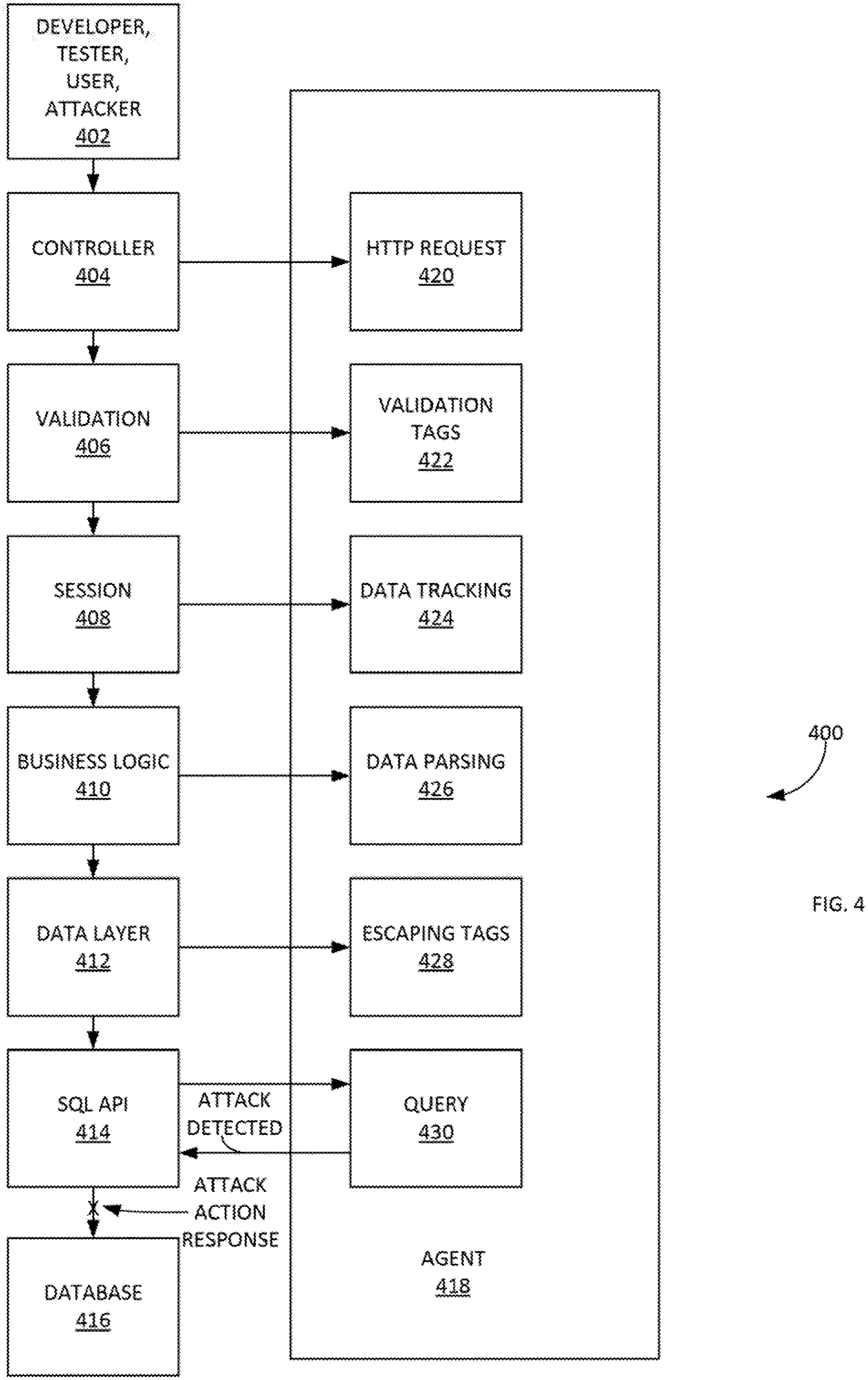
FIG. 4 illustrates an example use case of a process for attack detection and prevention, according to some embodiments.

FIG. 4 illustrates an example use case of a process 400 for attack detection and prevention, according to some embodiments. The system can include a user 402 of an application with methods 404-414. User 402 can be a developer, user, attacker, etc. Methods 404-414 can comprise various application modules and concomitant sensor(s) as shown. It is noted that each application method can include more than one sensors. For example, an agent can place specified sensors into the various aspects of the application.

Process 400 is initiated when a user sends a request into the application. As controller 404 runs, its sensor(s) can be implemented. Each sensor can create an event that becomes part of the security context (e.g. a trace, etc.). The event can be a snapshot that is stored inside security-context agent 418. The snapshot can be of a particular point in time (e.g. a particular method call inside the controller, etc.). These snapshots can be passed into security-context agent 418. Security-context agent 418 can include various security contexts 420-430 relevant to the concomitant methods 404-414 as shown. It is noted that other security contexts can be implemented in other example embodiments. In the present example, the snapshots from methods 404-412 can be analyzed and an attack may not be detected and/or acted upon (e.g. throwing an exception, etc.). However, SQL API method 414 can have a sensor. During implementation of SQL API method 414, a snapshot of a SQL API method call can be obtained and analyzed by the sensor in SQL API method 414. An attack can be detected by said sensor. For example, SQL API method 414 may be about to send a query to database 416. The sensor can then throw an exception such that the database query is not sent to database 416. In this way, the attack can be blocked. In a more general case, process 400 can use sensors at any point in the flow from modules 404-414. If any sensor detects an attack it can throw an exception (or other attack response action such as those provided herein).

Figure 5:
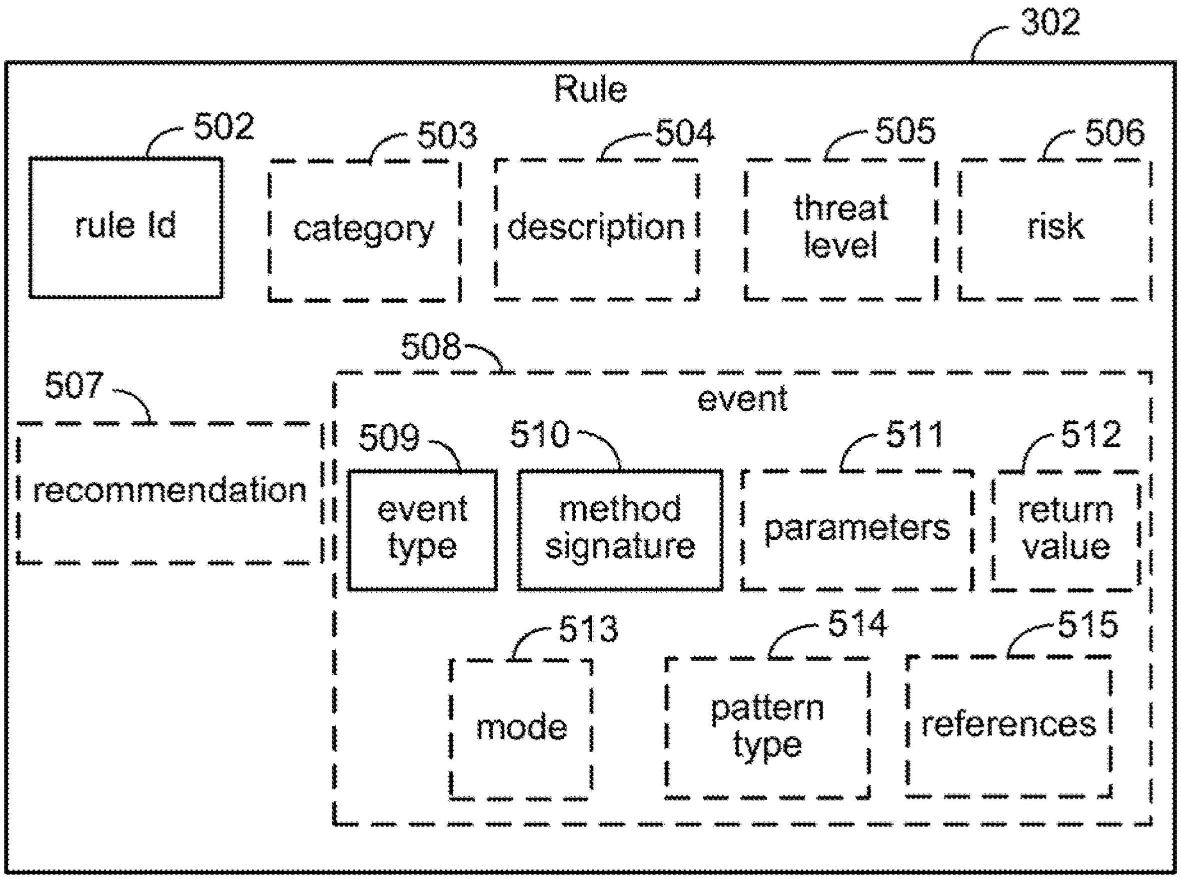
FIG. 5 is a block diagram of a security rule, according to some embodiments.

FIG. 5 is a block diagram of an example structure of a security rule 302. Security rule 302 is a complex data structure that may include various fields. Security rule 302 can include a security rule id field 502, which is a text string or a number that uniquely identifies the security rule among other security rules. For example, security rule id can be set to "security rule #1." Security rule 302 can also include a category field 503, which provides the general category of the attack detection and protection that the security rule is designed to handle, such as authentication, session management, authorization, validation and encoding, secure communications, encryption, caching, or availability. In addition, security rule 302 can include a description field 504 that provides the general description of the security rule and its purpose, such as "this security rule detects and blocks attempts to exploit cross-site request forgery." Furthermore, security rule 302 can include a severity level field 505, which indicates overall risk level of the attack. For example, severity levels can be set to levels, such as "low," "medium," or "high." Security rule 302 can also include a guidance field 507 that stores guidance to the user for handling the detected attack.

In addition, security rule 302 includes a set of criteria 508 that comprise a pattern that is being detected by the security rule 302. These criteria can combine different types of events and application state information. When the state of the application meets the criteria defined by the rule, the attack detection and prevention system 200 invokes the associated response actions.

The event field 508 can also include a method signature field 510, which indicates the signature or the name of the method that is being instrumented for this event, such as "javax.servlet.Servlet.service( )." The instrumentation module 220 will instrument all methods that match the pattern listed by the event. The event field 508 can also include parameters field 511 that specifies input parameters passed to the specified method. In addition, the event field 508 can include a return value field 512 that specifies the required value to be returned by the method (e.g., "true".) These input and output parameters, as well as the object values, can be used by the tracking module 240 to determine whether the event matches a vulnerability pattern.

Security rules 302 can check for a number of patterns that indicate presence of attacks, such as command injection, cross-site scripting, weak cryptography, cross-site request forgery, insecure transport, insecure redirect, parameter tampering, session hijacking, security misconfiguration, weak authentication, broken access control, and weak input validation. These patterns fall into categories of authentication, session management, authorization, validation, encoding, secure communications, encryption, caching, and availability.

For instance, the attack detection and protection system can check whether the application 230 is being attacked with SQL injection. In this case, the attack detection and protection system analyzes the incoming HTTP request for potential attacks, tracks data from the HTTP request through the application, identifies where that data is concatenated into a SQL query, and assesses whether the meaning of the query is modified by the attack data. If a SQL attack is detected, then the attack response actions include generating a security exception from within the method sending the query containing the attack to the database. In addition, the responses also include logging all the attack details locally, sending the attack details to a security management console, and/or notifying interested parties of the attack in progress.

In another example, a security rule can be specified to detect an a cross-site request forgery attack. This rule uses information from the incoming HTTP request, such as, inter alia, whether the request is a normal HTTP request or has an X-Requested-With header. The rule also checks to determine if a token check is made during the pendency of the request. And the rule determines whether the request is non-idempotent by analyzing SQL queries, file system access, and/or other transactions to determine if they are state-changing. Putting all this information together allows the attack detection and protection system to accurately detect cross-site request forgery vulnerabilities and attacks against those vulnerabilities. The cross-site request forgery rule also protects against attacks by adding a token to HTML pages generated by the application such that future requests can include that token. The rule then verifies that requests contain the right token. In some implementations, this token can be added by instrumenting the application with sensors to inject HTML, JavaScript, and/or other content into pages as they are generated.

While the foregoing is directed to examples of specific security rules, other security rules may be devised without departing from the basic scope thereof. Security rules 302 may be written to detect any type of security on the application 230.

In another implementation, the vulnerability detection system can dynamically add sensors to an application based on the runtime behavior of the application being monitored. Adaptive instrumentation is instrumentation that is performed dynamically for methods that are not known to require a sensor during application startup. A variety of runtime conditions detected by the invention can trigger the further instrumentation of methods. For example, rather than instrumenting all the methods that fetch data from a database, regardless of whether they produce trusted or untrusted data, the invention can use runtime information to select only those methods likely to produce untrusted data for instrumentation. For example, in one possible implementation, when the invention detects that untrusted data is passed to a "setData( )" method that stores data in a datastore, the invention will instrument the corresponding "getData( )" method to ensure the untrusted data is tracked even though the datastore may be a separate system. Adaptive instrumentation thereby avoids a common source of false positives by ensuring that only necessary methods are instrumented.

Figure 6:
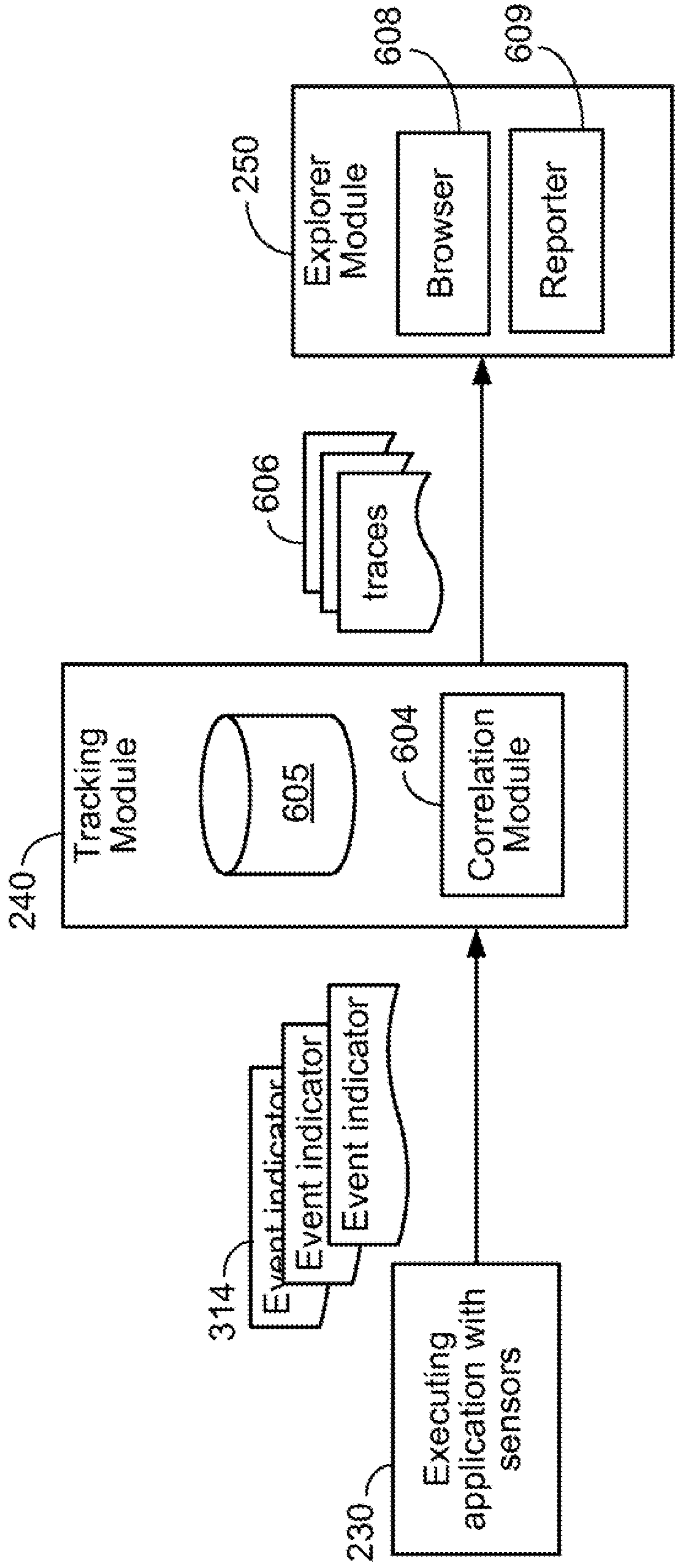
FIG. 6 is a block diagram of the attack detection and protection system, according to some embodiments.

Now referring to FIG. 6, the second stage of the operation of the attack detection and protection system 200 is discussed. Specifically, FIG. 6 is a block diagram that illustrates how the events are generated, collected, analyzed, and reported by the attack detection and protection system 200.

As explained with respect to FIG. 3, when the instrumented application 230 executes, sensors installed in the application 230 generate events 315 whenever an instrumented method is invoked. Once generated, events 315 are passed to the tracking module 240, which stores the received events in database 605 (and/or a local memory data store) for further analysis using the correlation module 604. In some implementations, database 605 is a weak reference database that tracks objects in memory only until they are garbage-collected. Using a weak reference scheme ensures that data is not tracked for longer than necessary to complete its work, which conserves system resources and prevents memory leaks.

The tracking module 240 begins to analyze the collected data as it is collected. The correlation module 604 can perform correlation between events. In some cases, this partial analysis will instantly rule out attacks, preventing the need for further processing. In other cases, analysis will continue throughout the operation of an application, detecting attacks just before they occur. In some cases, attacks may be detected after they have done their harm.

FIG. 7 illustrates an example of how the tracking module detects attacks. Data from the HTTP request is analyzed to determine if it contains characters and patterns that can indicate it is part of an attack. These possible attacks are tracked for further analysis. If any of the possible attacks are used in a SQL query, the full structure of the SQL query is semantically analyzed to determine if the possible attack changed the meaning of the query. If an attack is detected, the associated response sensors are activated. Other rules rely on different sensors and include a custom detection algorithm.

To view the results of the analysis, the attack detection and protection system 200 can utilize an explorer module 250 to simplify viewing and analysis of attacks. The explorer module 250 can include a browser module 608 and a reporter module 609. The browser module 608 provides a graphical user interface for viewing attacks and attack trends. The reporter module 609 is used to generate reports about attacks, which are viewable either through the browser module 608 or as stand-alone documents. The reports can include all the details of attacks from any sensors.

FIG. 8 is a screen-shot illustrating an example attack 800 identified by the tracking module 240. The attack 800 includes information associated with an attack pattern specified by the rule. The attack 800 includes data from one or more events received from the instrumented application 230. Attack data 801 can include information about the type of the event, context associated with the event, the method that generated the event as well as data 802 associated with the method. This data 802 can include input parameters, output values, and stack 803. In short, the event field 801 can include all or at least some of the information associated with the event, as described with respect to FIG. 4.

Figure 9:
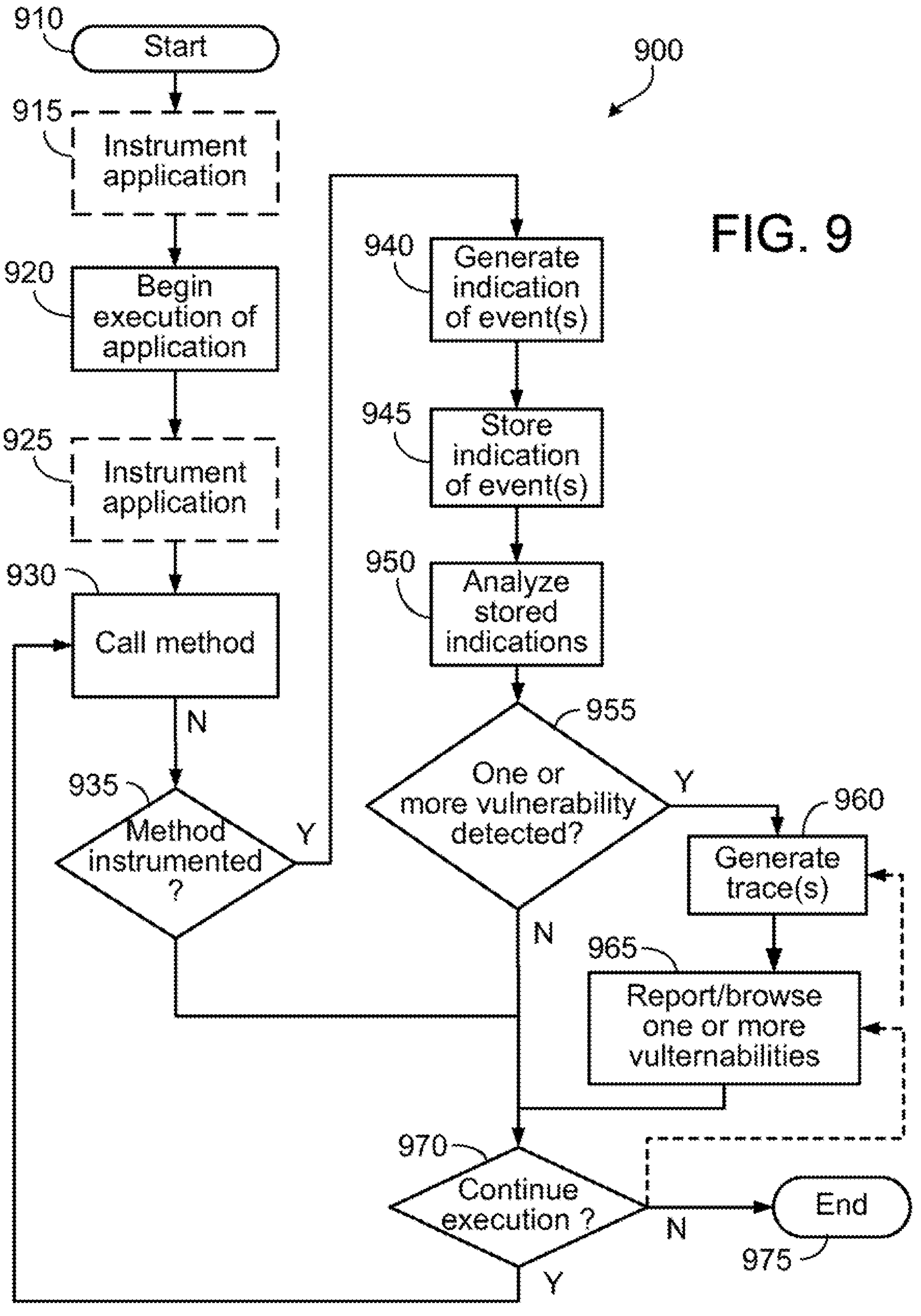
FIG. 9 is a flowchart of steps executed by the attack detection and protection system, according to some embodiments.

FIG. 9 is a flowchart illustrating example steps 900 that can be executed by attack detection and protection system 200. In the optional step 915, the application 230 is instrumented with one or more sensors. The attack detection and protection system 200 uses instrumentation module 220 to instrument the application 230 based on the security rules 302. In this step, the application 230 is instrumented statically because it has not begun execution yet. In step 920, the application 230 begins execution. In the optional step 925, the application 230 is instrumented dynamically during its execution. As with static instrumentation, the vulnerability detection system 200 uses the instrumentation module 220 to instrument the application 230 with sensors based on the requirements set forth in security rules 302. In step 930, one of application's 230 methods is invoked. If the called method has been instrumented with one or more sensors (step 935), then the installed sensor(s) in that method generate at least one the event (step 940). If the method is not instrumented, then an event is not generated and the application 230 continues its execution. In step 945, the generated event is stored with other events in tracking module 240. In step 950, the tracking module 240 analyzes the stored events and detects any possible attacks based on the analysis. If at least one attack is detected (step 955), the tracking module 240 generates at least one attack report (step 960). The explorer module 250 reports the attack report to a user and enables the user to browse and analyze the attack report, which identifies at least one attack on the application 230 (step 965). Notably, generation of attack reports and browsing of results can occur while the application 230 is executing or after it has completed execution. Therefore, a user can wait until the application 230 has completed its execution to browse the results generated by the attack detection and protection system 200. Alternatively, or in addition, a user can browse the results or be alerted about existence of attacks immediately after vulnerabilities are detected and/or while the application 230 is still executing.

Figure 10:
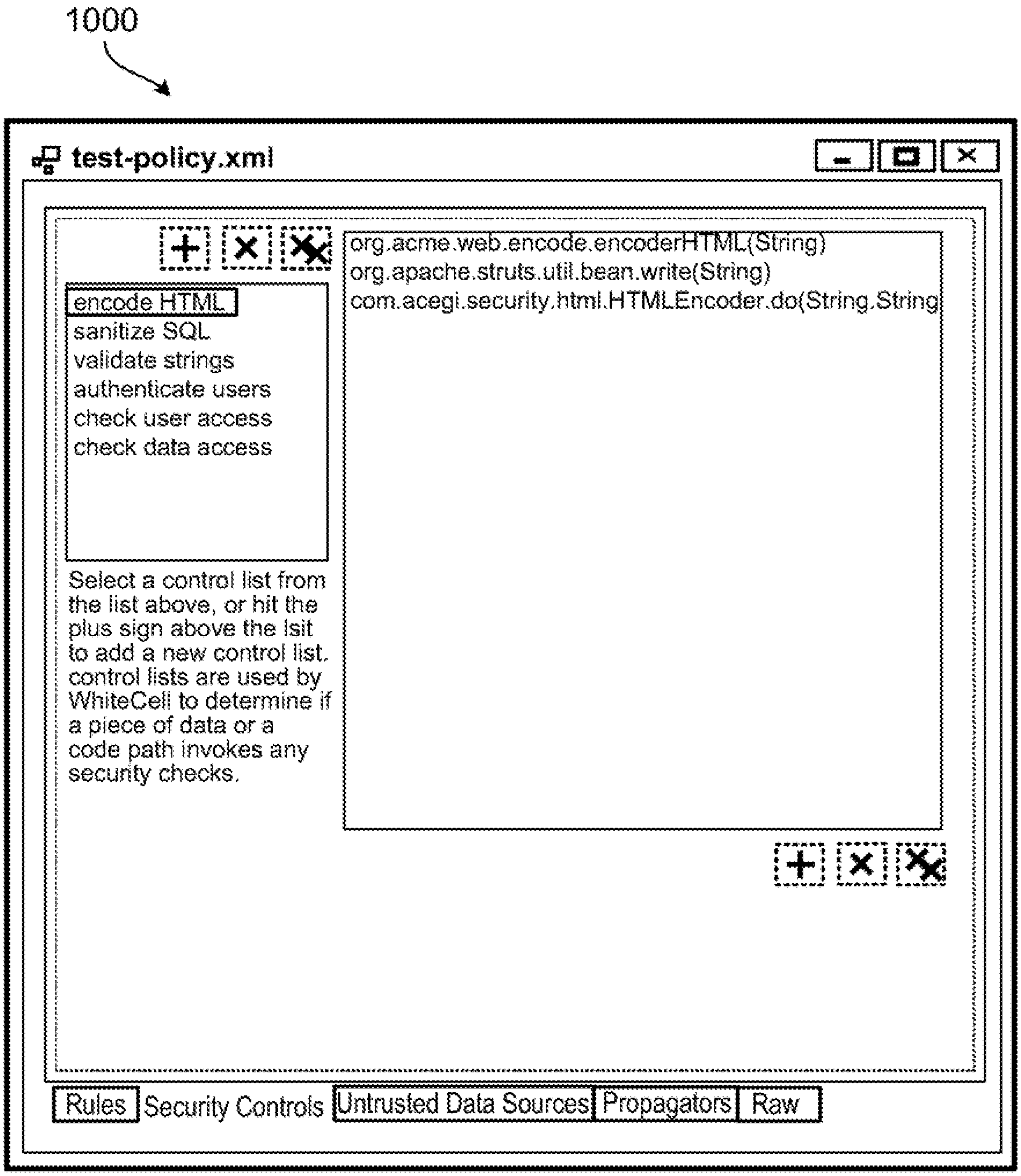

FIGS. 10-17 are screen-shots illustrating various aspects of an administrative interface used for accessing the vulnerability detection system 200. In particular, FIGS. 10 and 11 illustrate various aspects of a user interface used for configuring policies and rules for the attack detection and protection system 200. This interface may be displayed to a user by the policy module 210.

FIG. 10 is a screen-shot illustrating an example Graphical User Interface (GUI) 1000 for an administrative interface used for accessing the attack detection and protection system 200. The GUI 1000 includes various fields that enable an administrative user to specify security policies 1001 for the application 230. Each security policy includes one or more security rules 1002 designed to detecting a particular type of application attack 230. In essence, a security policy is a collection of one or more security rules that are designed to identify one or more related attacks. Security polices can also be designed to ensure that security is enforced for particular components. For example, a user may create a policy that uses instrumentation to add, modify, enable, replace, configure, or otherwise affect security defenses within the application. Other types of policies can depend on the specifics of a particular application.

FIG. 11 is a screen-shot of an example GUI 1100 used for selecting and managing security rules. It is noted that GUI 1100 is only exemplary and may allow security rules to be managed across a portfolio of applications in a variety of ways.

FIGS. 12-18 are screen-shots illustrating various aspects of a user interface used for reviewing results produced by the attack detection and protection system 200. This interface may be displayed to a user by the explorer module 250.

Figure 12:
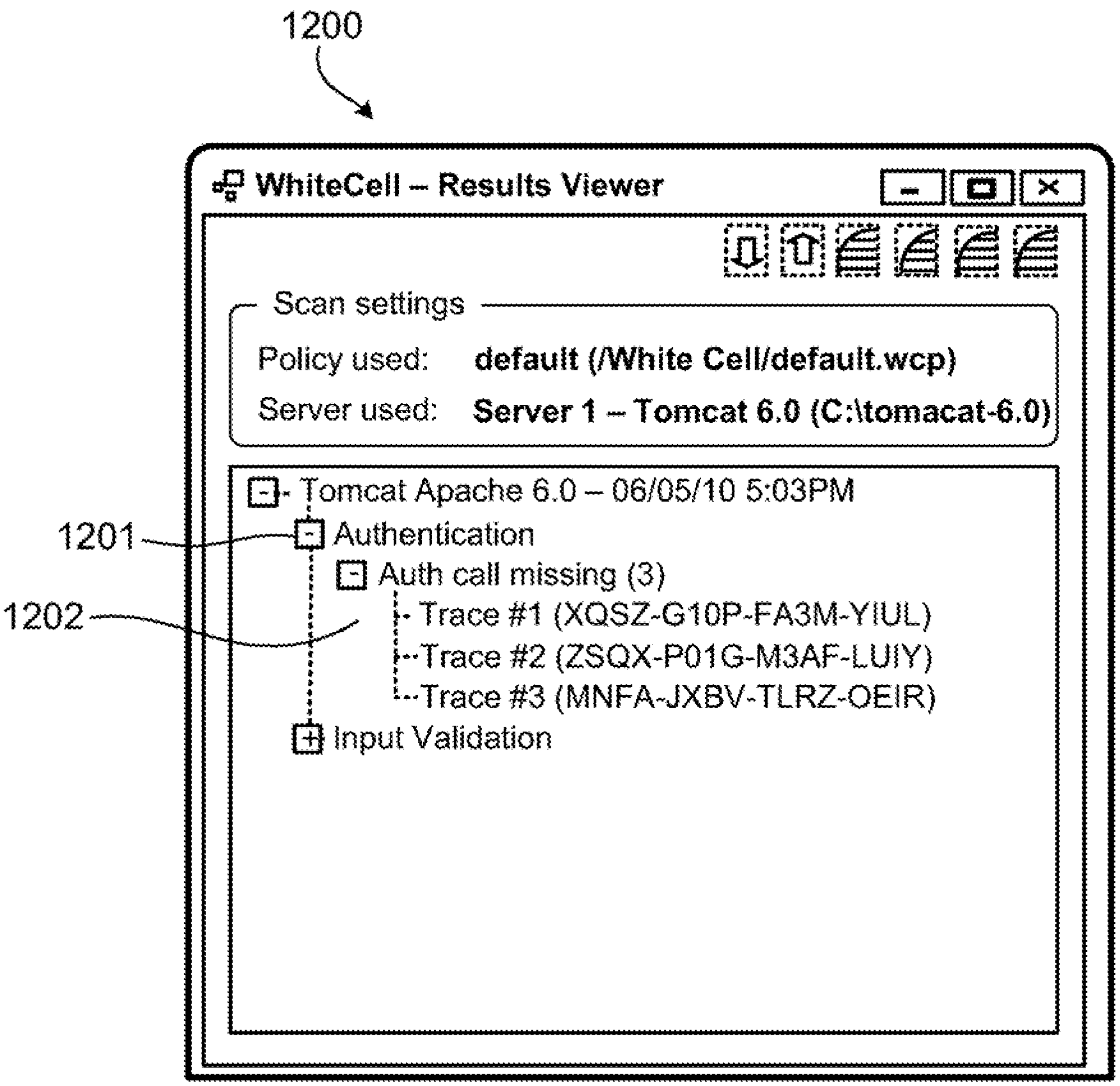
Figure 13:
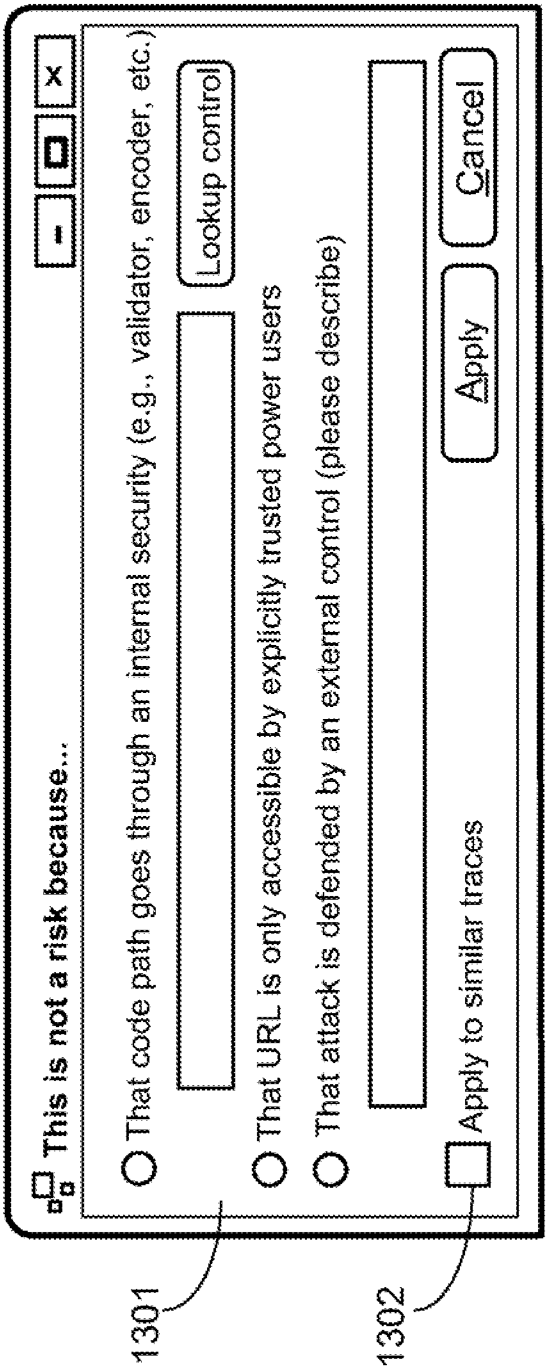

In particular, FIG. 12 is a screen-shot of an example GUI 1200 for browsing attacks identified by the tracking module 240. The GUI 1200 enables an administrative user to browse and review attacks 1202 identified by the vulnerability detection system 200. The traces may be searched and sorted in a variety of ways (e.g. by vulnerability type, time, source IP address, attack content, severity, and more). By clicking on links to individual attacks 1202, the user can further drill down to the specific details of each collected attack. Upon further review, an administrative user may decide that a particular collected trace does not actually indicate a vulnerability. Accordingly, the user may use GUI 1300, which is shown in FIG. 13, to indicate to the vulnerability detection system 200 that a particular trace is not an actual risk.

Upon further review, an administrative user may decide to implement an attack response action. Example attack response actions can include, inter alia, creating an exception (e.g. 'throwing an exception), blocking an IP address, etc. Another attack response action can include redirecting the user's web browser to another web page. Another attack response action can include sending the user's web browser to a honeypot mechanism. Another attack response action can be adding or enabling a specified security feature or reconfiguring the application. In some cases, the attack response may be visible or detectable to the attacker, and in other cases, the attacker will have no idea that their attack was detected and countered. In some cases, the attack response includes a false indicator to the attacker designed to confuse their efforts.

FIG. 14 is a screen-shot of an example GUI 1400 for reviewing an individual attack selected from the GUI 1300. The GUI 1400 includes a summary section 1401 that provides a high-level summary of the detected attack. For example, the summary section 1401 can include a short explanation of the attack's significance. In addition, the summary section 1401 can include an explanation of how the attack targeted the application.

Figure 15:
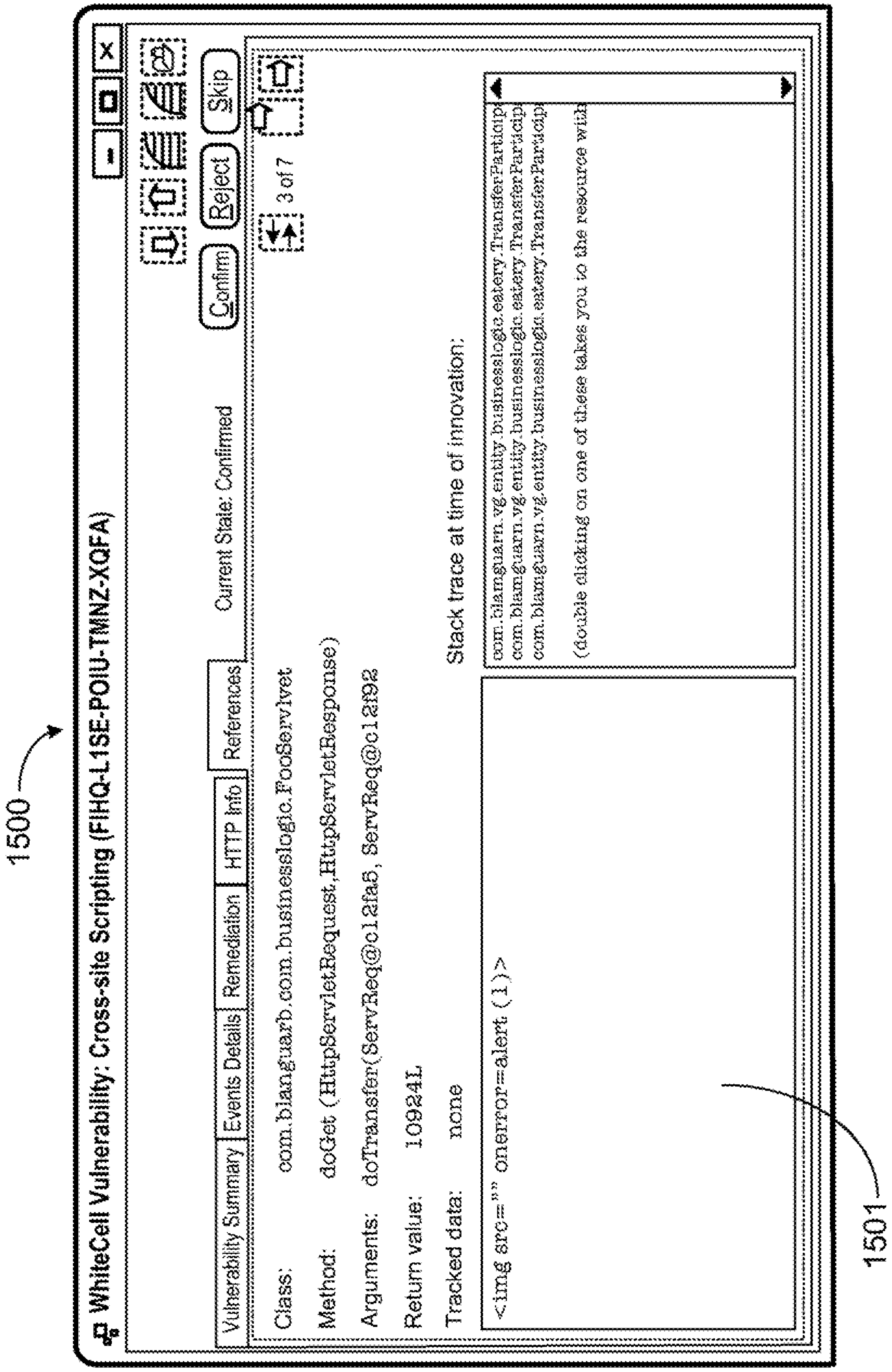
Figure 16:
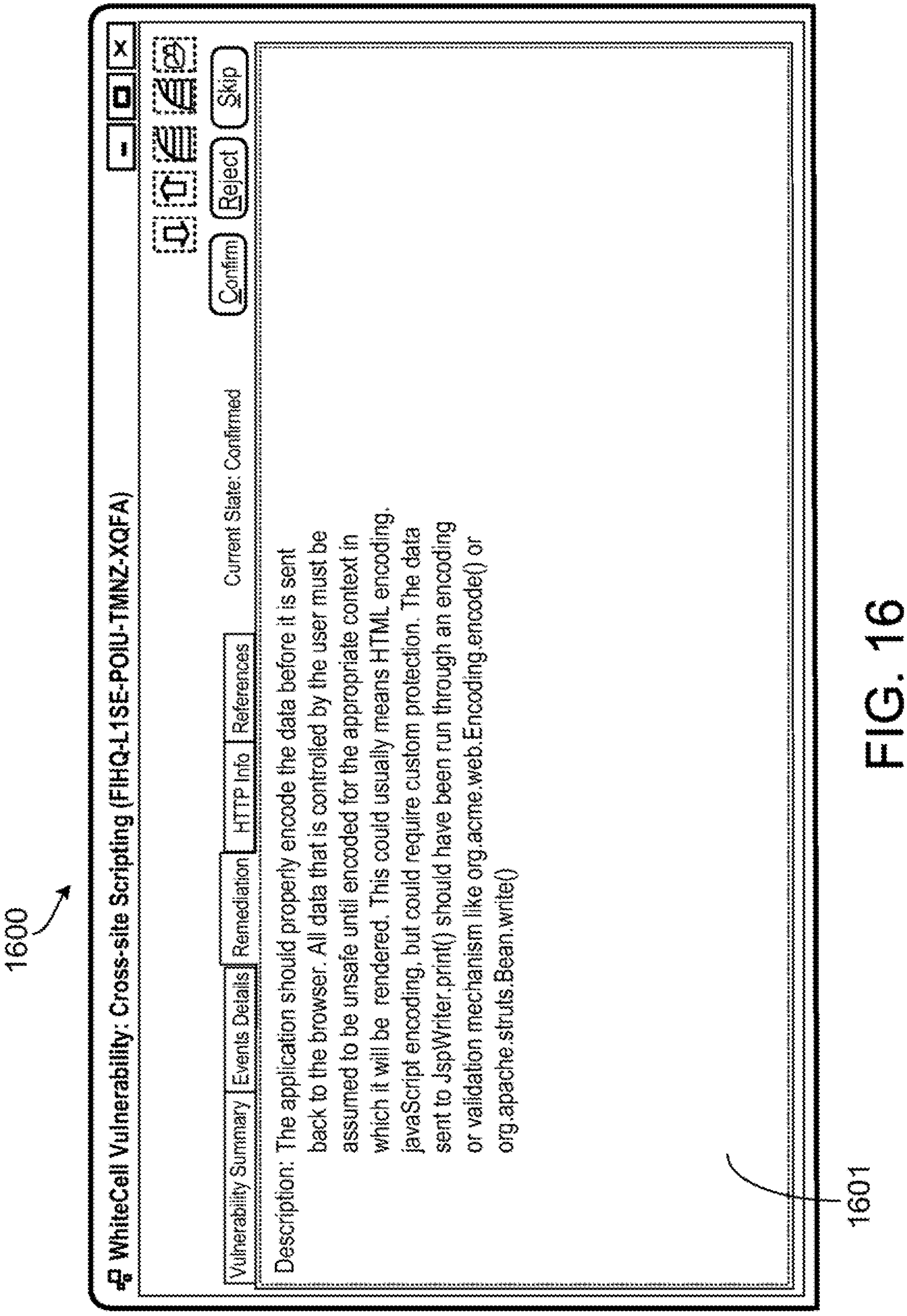
Figure 17:
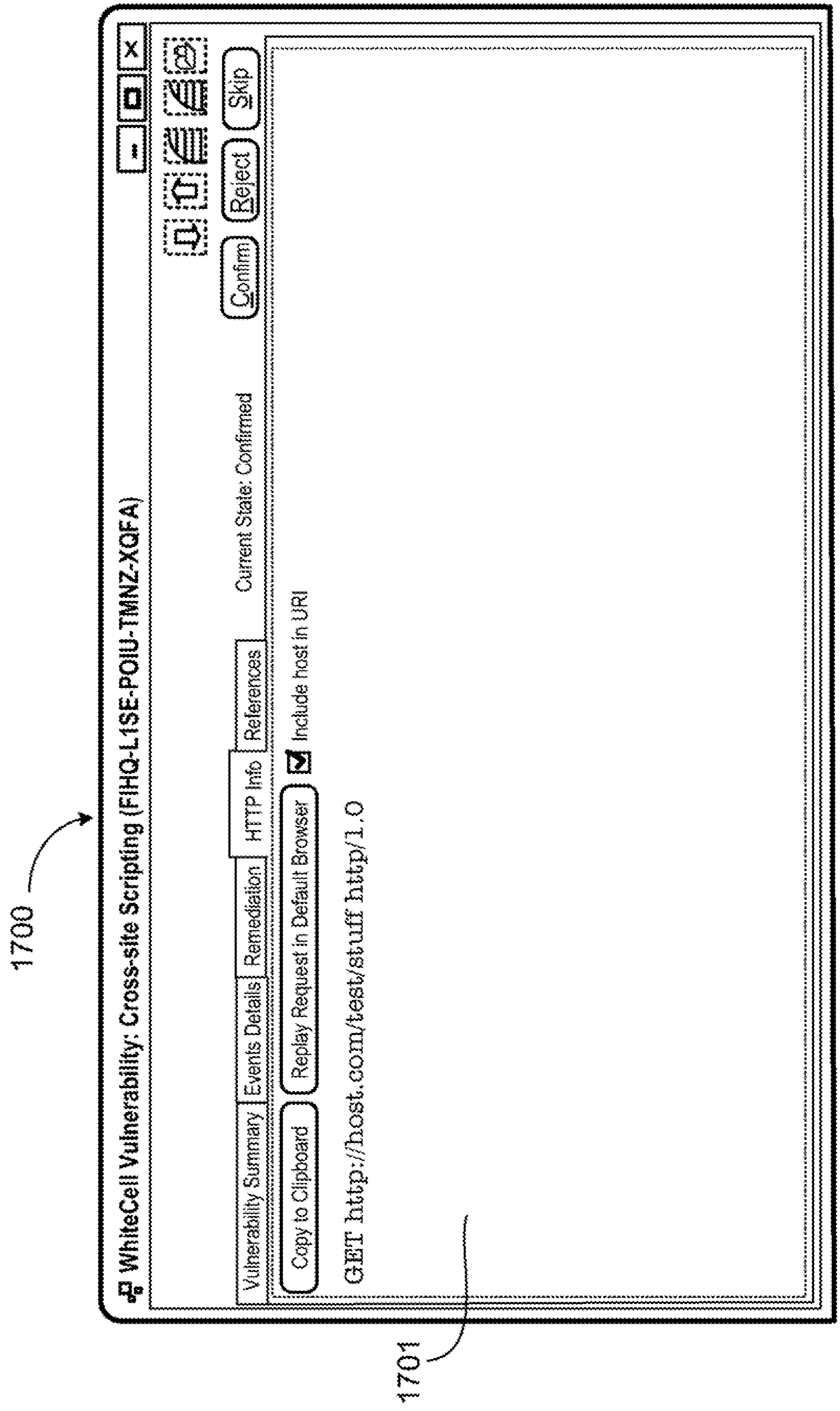
Figure 18:
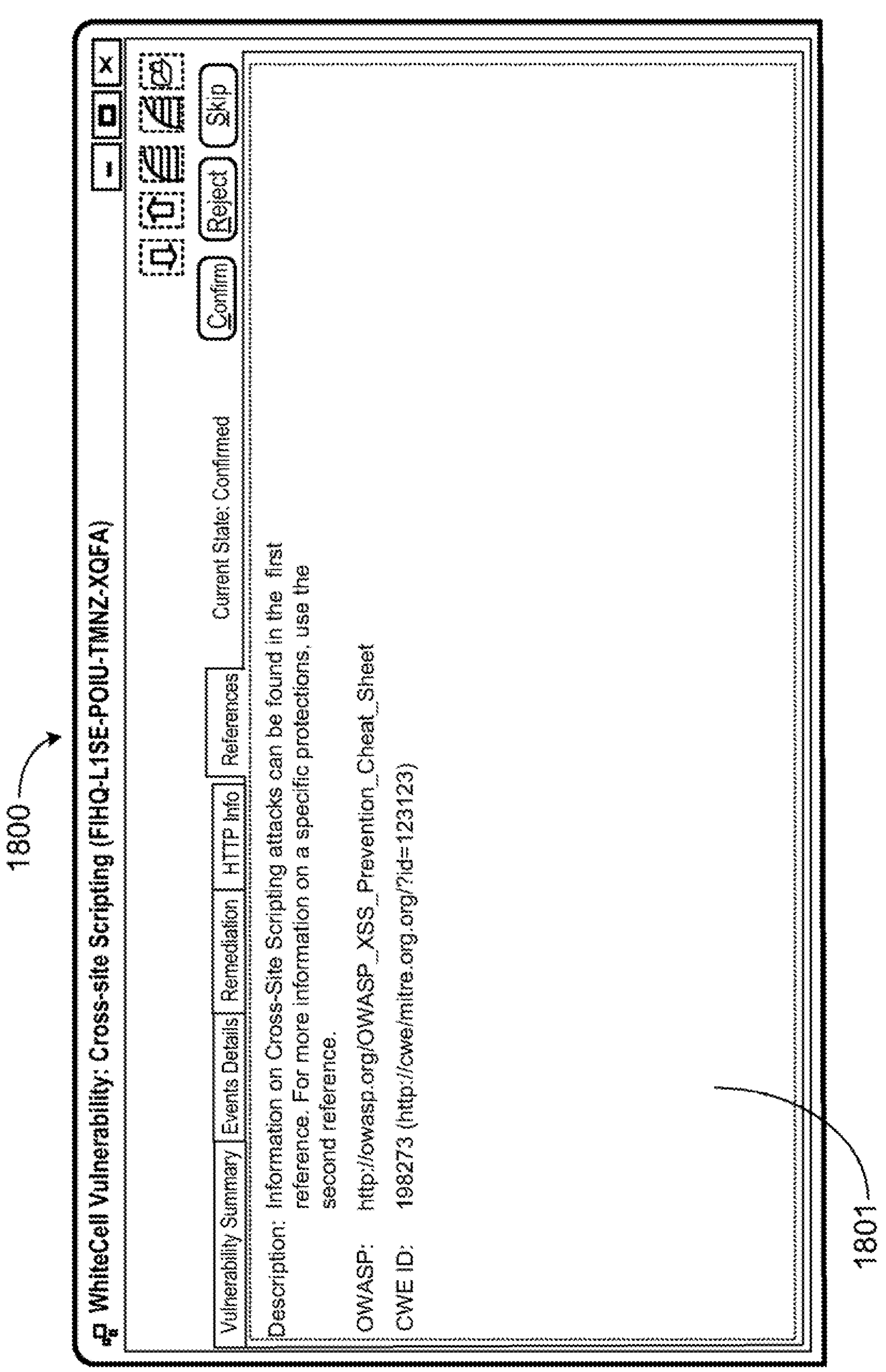

FIG. 15 is a screen-shot of an example GUI 1500 that provides the user with further detail about a detected attack report that was discussed with respect to FIG. 14. FIG. 15 includes various fields 1501 that provide further detail to a user about the one or more events that triggered within the rule. For example, fields 1501 may include a class and a method associated with the triggered event. In addition, fields 1501 may include the method's arguments, the return value of the method, and the stack trace at the time of the method's invocation. Furthermore, fields 1501 may provide the user with any other information associated with the triggered event, such as information about any tracked data associated with the event.

In some embodiments, the guidance may include an automatic generation of a security rule for an external security device such as a web application firewall. The external security device can help mitigate an attack or the impact of a successful attack.

The attack details could also include code snippets extracted from the application itself. Such code snippets may include suspected vulnerable code. The code snippets can be accessed from the file system on the computer running the application. The code snippets may also be decompiled from within the vulnerability detection system. The code snippets can be presented to the user of the detection system in an effort to more accurately describe the behavior of the application under attack and the impact of a successful attack. The snippets can be generated for all parts of an attack report, including not only the lines directly related to a particular event, but also the code segments for all the caller methods in the stack leading to the invocation of the particular event.

In another implementation, the attack detection and prevention system can automatically protect applications with known vulnerabilities. For example, the detection system can recognize that a particular application is using the Struts application framework (e.g., a standard in developing Web applications), and that a vulnerability exists in the manner in which the Struts application framework is being used by the particular application. Accordingly, the system may automatically deploy a Struts-specific "shield" to prevent the known vulnerability from being exploited. A "shield" is a custom type of sensor that is instrumented into one or more locations in an application to prevent a vulnerability from being exploited. The same approach could be used to provide a "shield" for vulnerabilities in the custom code of the application.

The interfaces in FIGS. 11-18 are only exemplary and may each include fewer or more fields related to the details of security rules or detected attacks, depending on the specific details of rules or detected attacks.

Figure 19:
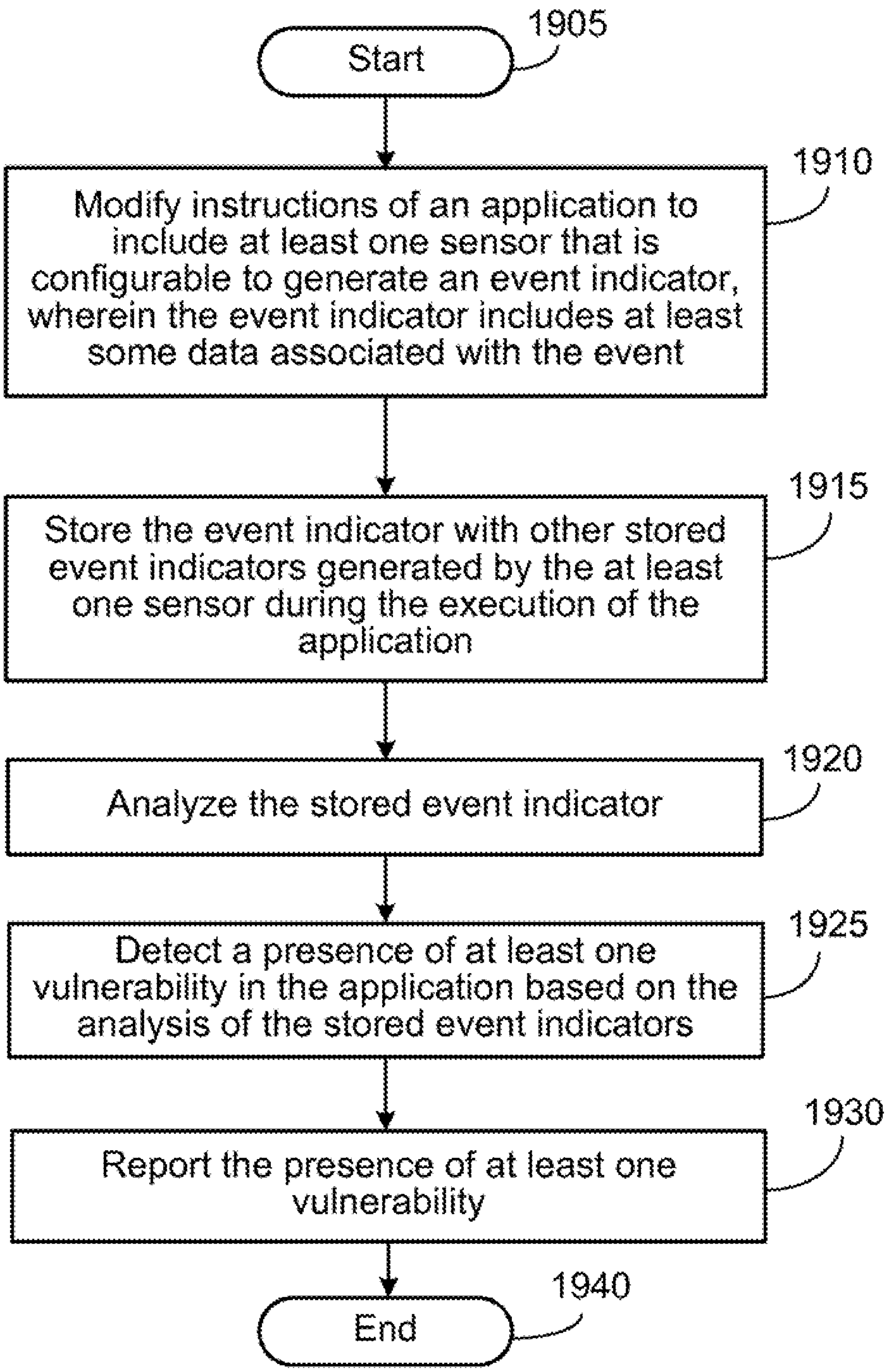
FIG. 19 is a flowchart of steps executed in accordance with implementations of the present disclosure.

Referring now to FIG. 19, example steps that can be executed in accordance with implementations of the present disclosure will be described. The example steps of FIG. 19 can be executed using one or more processors coupled to a computer-readable storage medium at a computer system (e.g., the computer system 114 including server 102) and/or a client device (e.g., the client devices 108, 110).

In step 1910, instructions of the application are modified to include at least one sensor that is configurable to generate an event, wherein the event includes at least some data associated with the event. In step 1915, the event is stored with the other stored events generated by the at least one sensor during the execution of the application. In step 1920, the stored the events are analyzed as they are captured. In step 1925, a presence of at least one attack on the application is detected based on the analysis of the stored events. In step 1930, the presence of at least one attack is reported.

The attack detection and protection system 200 can be used in a variety of different environments and/or for different purposes. For example, an analyst can run the application 230 with the attack detection and protection system 200 to find out whether it is under attack, being exploited, or has vulnerabilities. The analyst may be able to run the application 230 without requiring a special setup, environment or source code. The resulting output of attack detection and protection system 200 would detail the security posture of the application.

In another example, an application owner without security knowledge can run the application 230 with the attack detection and protection system 200 enabled, perhaps only focused on their particular code. In this example, the attack detection and protection system 200 would produce warnings about detected and blocked attacks on the application.

And in yet another example, a security expert may be able to add custom sensors and security rules to the attack detection and protection system 200, thus tailoring the attack detection and protection system's engine to the types of attacks that are specific to the organization's business and technology. The expert can use the attack detection and protection system 200 to gather information about how the application 230 responds to simulated attacks during security testing. For example, the attack detection and protection system 200 can report any violation of the rules involving any technology from the application 230. Even patterns of code execution that are not typically thought of as attacks can be identified by the attack detection and protection system, such as unusual user behavior or atypical exception occurrences.

In one implementation, attack detection and protection system 200 can be integrated with existing vulnerability analysis tools. The vulnerability tools are used to identify locations in the code that are vulnerable to attack. The attack detection and protection system can use sensors to protect those specific locations from being exploited. Using vulnerability tools in combination with the attack detection and protection system allows custom security rules to be evolved more quickly, thus improving the accuracy and performance. For example, if an application is determined to have two specific SQL injection vulnerabilities, the attack detection and protection system can apply specific protections to prevent those two vulnerabilities from being exploited, thus improving the performance of the defenses while sacrificing general protection against all SQL injection attacks.

In some implementations, the attack detection and protection system 200 can be used to protect applications sold or distributed from an application store. Such an application store may be any location where one or more software applications are available to users for activation or download. Examples of applications can include video game programs, personal information management programs, programs for playing media assets and/or navigating the media asset database, programs for controlling a telephone interface to place and/or receive calls, and so on. These applications are often first developed by third parties and then uploaded to the application store, where they can be downloaded by the users of the store. Either the store operator or the end user may use the attack detection and protection system to defend the applications being downloaded.

Figure 20:
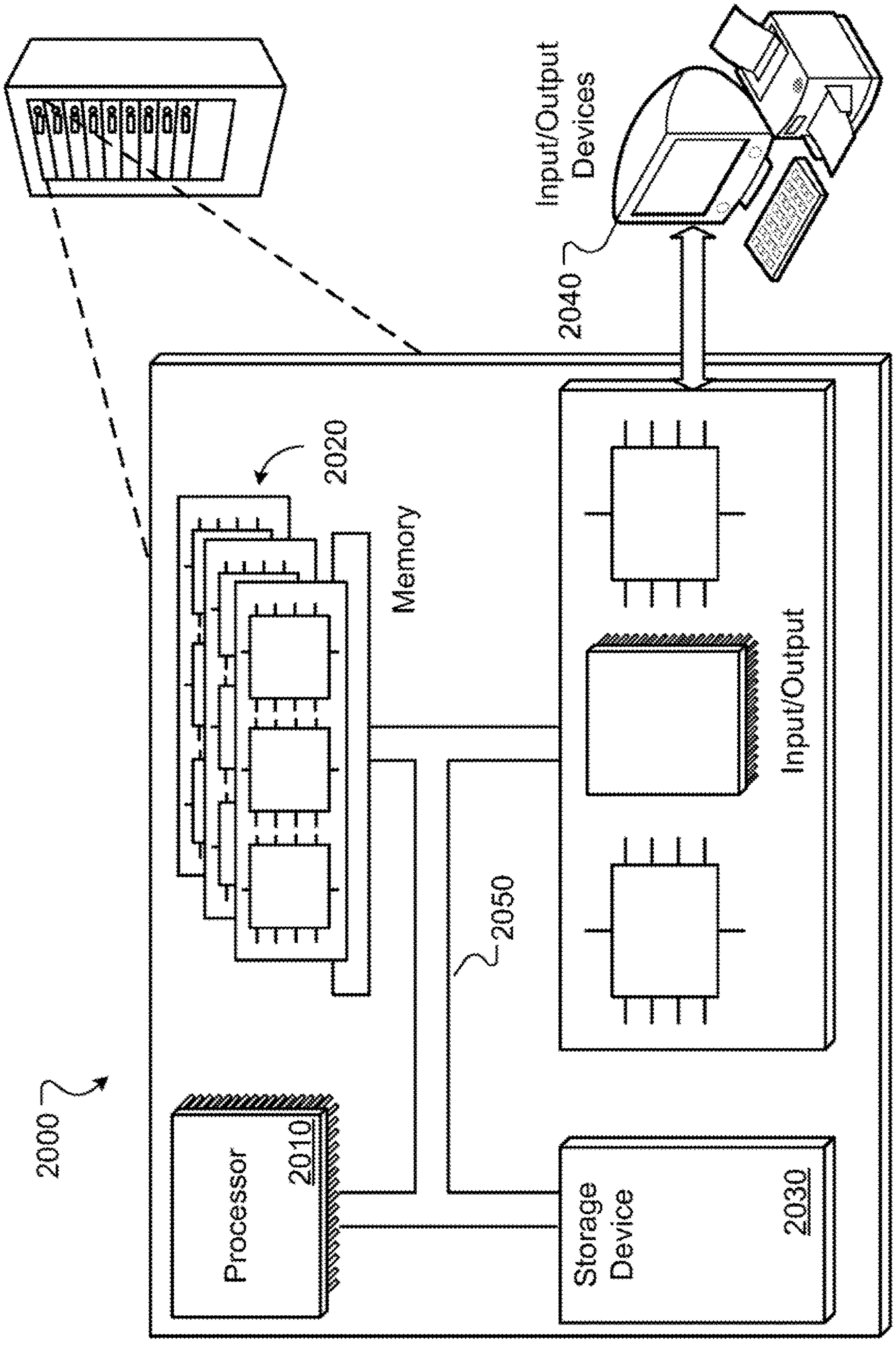
FIG. 20 is a schematic illustration of hardware components executing implementations of the present disclosure.

Referring now to FIG. 20, a schematic illustration of example hardware components that can be used to execute implementations of the present disclosure is provided. The system 2000 can be used for the operations described in association with the methods described in accordance with implementations of the present disclosure. For example, the system 2000 can be included in the application server 102 executing the vulnerability detection system 200. The system 2000 includes a processor 2010, a memory 2020, a storage device 2030, and an input/output device 2040. Each of the components 2010, 2020, 2030, and 2040 are interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030 to display graphical information for a user interface on the input/output device 2040.

The memory 2020 stores information within the system 2000. In one implementation, the memory 2020 is a computer-readable medium. In one implementation, the memory 2020 is a volatile memory unit. In another implementation, the memory 2020 is a non-volatile memory unit. Memory 1520 stores data, which typically comprises security rules, instructions, algorithms, code, or any other directives operable to enable the system to detect vulnerabilities. Stored data can be any suitable format such as, for example, an XML document, a flat file, CSV file, a name-value pair file, an SQL table, an HTML page, a text message, or others. In addition, data can include instructions written in or based on any appropriate computer language including C, C++, Java, Visual Basic, Perl, and others.

The storage device 2030 is capable of providing mass storage for the system 2000. In one implementation, the storage device 2030 is a computer-readable medium. In various different implementations, the storage device 2030 can be a floppy disk device, a hard disk device, an optical disk device, or a tape device. The input/output device 2040 provides input/output operations for the system 2000. In one implementation, the input/output device 2040 includes a keyboard and/or pointing device. In another implementation, the input/output device 2040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet. In addition, the vulnerability detection system can also operate in a hosted computing system, often referenced as "the cloud." The vulnerability detection system can be stored and executed from a server system, rather than from a client device, thus allowing the vulnerability detection system to be shared easily between users. In addition, the vulnerability detection system can also be implemented to operate with wireless handheld and/or specialized devices. The computer system can include clients and servers. A client and server are generally remote from each other and typically interact through a network, such as the described one. The relationship of client and server arises by virtue of computer programs running on the respective computers and having a client-server relationship to each other. However, one skilled in the art would recognize that any application, whether it embedded, mobile, desktop, server, or cloud, could use the described technology to detect vulnerabilities. Accordingly, one can use the described detection technology to monitor the running application and get notifications when the application violates the established policies.

An attack response can be any action invoked by invention to detect, deter, deny, or otherwise respond to an attack. The action might involve code already in the application, code provided with the invention, or a combination of both.

Lazy attack evaluation means that the processes or systems herein can wait to respond to an attack until right before the effects of the attack manifest themselves. In some example embodiments, an attack response can happen at any time from when the attack is made upon the application all the way until immediately prior to the harmful effects of the attack. It is noted that there may be multiple responses to the attack or partial responses to the attack in the time between the attack arrives and immediately before the harmful effects occur.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method of automatically detecting and blocking at least one attack on an application comprising:
- wherein the at least one attack is on the application;
  - modifying, from within the application, instructions of the application to include at least one sensor, wherein the sensor generates a set of events related to detecting an attack on the application, when executed by one or more processors, or a computing system implementing the application, wherein the at least one sensor is configured to create an event based on a configuration information for the application, and wherein the sensor comprises a passive sensor that generates an event that is collected and analyzed whenever an instrumented method is invoked;
  - reviewing, from within the application, the set of events generated by the at least one sensor;
  - detecting, from within the application, a presence of the at least one attack on the application based on the review of the set of events; and
  - invoking, from within the application, an attack response action, wherein the step of invoking an attack response action further comprises:
    - enabling a custom set of rules and responses to be enforced as a virtual patch,
    - modifying a set of instructions of the application snapshot to include at least one sensor adapted to generate an action selected by testing and analyzing a runtime behavior of a run-time library or run time component, and
    - dynamically patching a code segment at a run-time of the application, and
  - wherein the sensors and the attack response actions are controlled by a set of custom rules created by a user, and
  - wherein the set of custom rules are used to implement the virtual patch to the application.

2. The computerized method of claim 1, wherein the set of events are related to detecting both the attack on the application or the computing system implementing the application and a vulnerability detection related to an attack vulnerability of the application or in the computing system implementing the application.

3. The computerized method of claim 1, wherein the detected attack comprises a bot attack.

4. The computerized method of claim 1, wherein the detected attack comprises an attempt to exploit a specific known vulnerability in a library the application or in the computing system implementing the application.

5. The computerized method of claim 1 further comprising:
- implementing a lazy-attack evaluation.

6. The computerized method of claim 1, wherein the attack response action comprises a logging action that records a set of events related to the attack.

7. The computerized method of claim 1, wherein the attack response action comprises throwing an exception.

8. The computerized method of claim 1, wherein the attack response action comprises redirecting the user's web browser to another web page.

9. The computerized method of claim 1, wherein the attack response action comprises sending the user's web browser to a honeypot mechanism.

10. The computerized method of claim 1, wherein the attack response action comprising adding or enabling a specified security feature or reconfiguring the application.

11. The computerized method of claim 1, wherein the sensor is configured to create an action snapshot based on the data in HTTP requests and a response that is either received or transmitted by the application.

12. The computerized method of claim 1, wherein the code segment to be patched is a software component or library that is a part of the application.

13. A server system of automatically detecting and blocking at least one attack on an application comprising:

a processor configured to execute instructions;

a memory containing instructions when executed on the processor, causes the processor to perform operations that:

modify, from within the application, instructions of the application to include at least one sensor, wherein the sensor generates a set of events related to detecting an attack on the application or a computing system implementing the application, wherein the at least one sensor is configured to create an event based on a configuration information for the application, and wherein the sensor comprises a passive sensor that generates an event that is collected and analyzed whenever an instrumented method is invoked;

review, from within the application, the set of events generated by the at least one sensor;

detect, from within the application, a presence of at least one attack on the application based on the review of the set of events; and invoke, from within the application, an attack response action by:

enabling a custom set of rules and responses to be enforced as a virtual patch, modifying a set of instructions of the application snapshot to include at least one sensor adapted to generate an action selected by testing and analyzing a runtime behavior of a run-time library or run time component, and dynamically patching a code segment at a run-time of the application, and wherein the sensors and the attack response actions are controlled by a set of custom rules created by a user, and wherein the set of custom rules are used to implement the virtual patch to the application.

14. A computerized method of automatically detecting and blocking at least one attack on an application comprising:

modifying, from within the application, instructions of the application to include at least one sensor, wherein the sensor generates a set of events related to detecting an attack on the application, when executed by one or more processors, or a computing system implementing the application, wherein the sensor is configured to create an event based on a configuration information for the application, and wherein the sensor comprises an active sensor or a passive sensor that generates an event that is collected and analyzed whenever an instrumented method is invoked;

reviewing, from within the application, the set of events generated by the at least one sensor;

detecting, from within the application, a presence of at least one attack on the application based on the review of the set of events; and invoking, from within the application, an attack response action, wherein the step of invoking an attack response action further comprises:

enabling a custom set of rules and responses to be enforced as a virtual patch, modifying a set of instructions of the application snapshot to include at least one sensor adapted to generate an action selected by testing and analyzing a runtime behavior of a run-time library or run time component, and dynamically patching a code segment at a run-time of the application, and wherein the sensors and the attack response actions are controlled by a set of custom rules created by a user, and wherein the set of custom rules are used to implement the virtual patch to the application.

* * * * *